(12) United States Patent
Vadlakonda et al.

(10) Patent No.: US 8,094,575 B1
(45) Date of Patent: Jan. 10, 2012

(54) ROUTING PROTOCOL EXTENSION FOR NETWORK ACCELERATION SERVICE-AWARE PATH SELECTION WITHIN COMPUTER NETWORKS

(75) Inventors: Sravan Vadlakonda, Sunnyvale, CA (US); Rohini Kasturi, Livermore, CA (US); Steven A. Malmskog, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 493 days.

(21) Appl. No.: 12/409,618

(22) Filed: Mar. 24, 2009

(51) Int. Cl.
H04J 1/16 (2006.01)
H04L 1/00 (2006.01)

(52) U.S. Cl. ........................ 370/252; 370/392
(58) Field of Classification Search ............... 370/230.1, 370/252, 254, 401, 392
See application file for complete search history.

(56) References Cited

U.S. PATENT DOCUMENTS

| | | | |
|---|---|---|---|
| 5,598,532 A | 1/1997 | Liron | |
| 6,301,244 B1 | 10/2001 | Huang et al. | |
| 6,377,551 B1 | 4/2002 | Luo et al. | |
| 6,473,405 B2 | 10/2002 | Ricciulli | |
| 6,981,055 B1 | 12/2005 | Ahuja et al. | |
| 7,020,087 B2 | 3/2006 | Steinberg et al. | |
| 7,167,593 B2 | 1/2007 | Singh | |
| 7,200,117 B2 | 4/2007 | Chiu et al. | |
| 7,254,138 B2 | 8/2007 | Sandstrom | |
| 7,289,489 B1 | 10/2007 | Kung et al. | |
| 7,339,897 B2 | 3/2008 | Larsson et al. | |
| 7,403,487 B1 | 7/2008 | Foladare et al. | |
| 7,460,473 B1 * | 12/2008 | Kodama et al. | 370/230 |
| 7,496,661 B1 | 2/2009 | Morford et al. | |
| 7,584,298 B2 | 9/2009 | Klinker et al. | |
| 7,599,385 B1 | 10/2009 | Andrade et al. | |
| 7,643,408 B2 | 1/2010 | Atkinson et al. | |
| 7,650,426 B2 | 1/2010 | Bamba | |
| 7,688,739 B2 | 3/2010 | Frei et al. | |
| 7,792,991 B2 | 9/2010 | Shand | |
| 7,869,355 B2 * | 1/2011 | Kodama et al. | 370/230 |
| 8,018,866 B1 * | 9/2011 | Kasturi et al. | 370/252 |
| 2006/0146825 A1 | 7/2006 | Hofstaedter et al. | |
| 2008/0091812 A1 | 4/2008 | Lev-Ran et al. | |
| 2008/0112325 A1 | 5/2008 | Sivakumar et al. | |
| 2008/0123533 A1 | 5/2008 | Vasseur et al. | |

(Continued)

OTHER PUBLICATIONS

Office Action from U.S. Appl. No. 12/254,034, dated Oct. 13, 2010, 23 pp.

(Continued)

*Primary Examiner* — Chuong T Ho
(74) *Attorney, Agent, or Firm* — Shumaker & Sieffert, P.A.

(57) ABSTRACT

In general, techniques are described by which a path through a network may be selected based on service information. For example, a network device may include one or more interfaces, a control unit, and an integrated network acceleration device that provides a first set of services. The interfaces may receive service information that describes a second set of services provided by another network device. The control unit then determines, based on the service information, whether the other device shares any services in common with the integrated device. If so, the control unit selects a path through the network that includes the other device and causes the integrated device to apply the shared service to a portion of the traffic. The interfaces forward this portion along the determined path to the other device such that the other device applies the shared network acceleration services to the portion of the network traffic.

29 Claims, 6 Drawing Sheets

U.S. PATENT DOCUMENTS

| | | | |
|---|---|---|---|
| 2008/0165784 A1* | 7/2008 | Ko et al. | 370/392 |
| 2008/0222283 A1 | 9/2008 | Ertugrul et al. | |
| 2008/0225710 A1 | 9/2008 | Raja et al. | |
| 2008/0320151 A1 | 12/2008 | McCanne et al. | |
| 2009/0034417 A1 | 2/2009 | Kondamuru et al. | |
| 2009/0067440 A1 | 3/2009 | Chadda et al. | |
| 2009/0073884 A1* | 3/2009 | Kodama et al. | 370/235 |
| 2009/0092137 A1 | 4/2009 | Haigh et al. | |
| 2009/0287968 A1 | 11/2009 | Lee et al. | |
| 2010/0085892 A1 | 4/2010 | Kouhi | |

OTHER PUBLICATIONS

Response to Office Action dated Oct. 13, 2010, from U.S. Appl. No. 12/254,034, filed Jan. 13, 2011, 18 pp.

Office Action from U.S. Appl. No. 12/198,652, dated Jan. 25, 2011, 38 pp.

Response to Office Action dated Jan. 25, 2011, from U.S. Appl. No. 12/198,652, filed Mar. 25, 2011, 23 pp.

U.S. Appl. No. 12/254,034, filed Oct. 20, 2008, entitled "Service Aware Path Selection With a Network Acceleration Device," Rohini Kasturi et al.

U.S. Appl. No. 12/251,018, filed Oct. 14, 2008, entitled Secure Path Selection Within Computer Networks, Hatem Eyada.

"Application Flow Acceleration for Web (HTTP) Traffic," Juniper Networks, Inc., 2005, 8 pgs.

L. Berger et al., "The OSPF Opaque LSA Option," Network Working Group RFC 5250, Jul. 2008, 16 pgs.

Office Action for U.S. Appl. No. 12/198,652, dated Jul. 30, 2010, 48 pp.

Response to Office Action for U.S. Appl. No. 12/198,652 dated Nov. 1, 2010, 26 pp.

Co-pending U.S. Appl. No. 12/198,652, Kasturi et al. "Adaptively Applying Network Acceleration Services with an Intermediate Network Device", filed Aug. 26, 2008.

Co-Pending U.S. Appl.No. 12/254,034, Kasturi et al. "Service Aware Path Selection With a Network Acceleration Device", filed Oct. 20, 2008.

Office Action for U.S. Appl. No. 12/254,034, dated May 10, 2010, 24 pp.

Response to Office Action for U.S. Appl. No. 12/254,034 dated Aug. 10, 2010, 24 pp.

Office Action from U.S. Appl. No. 12/254,034, dated Feb. 25, 2011, 25 pp.

Response to Office Action dated Feb. 25, 2011, from U.S. Appl. No. 12/254,034, filed May 25, 2011, 17 pp.

* cited by examiner

ROUTING PROTOCOL EXTENSION FOR NETWORK ACCELERATION SERVICE-AWARE PATH SELECTION WITHIN COMPUTER NETWORKS

TECHNICAL FIELD

The invention relates to computer networks and, more particularly, routing network traffic within computer networks.

BACKGROUND

In a typical network environment, client devices request and download content stored within network servers. Exemplary content includes web pages that may contain one or more of text, graphics, video, and sound data. Other examples of content include files, multimedia data streams (e.g., audio or video data streams), electronic messages, and data tables. Upon receiving the content requests, the network servers typically retrieve the requested content, break the requested content into packets, and transmit the packets to the requesting client device. Routers and other network infrastructure direct these packets through the network to the client devices, which, in turn, reconstruct the content from the packets and present the content to users via applications residing on the client devices.

The network may experience a variety of issues that result in decreased download speeds at the client devices. These issues include a large volume of content requests to a single network server that overload or otherwise diminish the capacity of the network server to timely service the requested content. Moreover, network congestion and limited network bandwidth may impact client download speeds. To increase download speeds and reduce bandwidth consumption, a network administrator may deploy one or more intermediate network devices, referred to as network acceleration devices, located between the client devices and the servers. These intermediate network devices may apply one or more network acceleration services to network traffic passing between the client devices and the servers in order to address the above listed issues or other issues that adversely affect download speeds. In the respect, the intermediate network devices may seek to optimize delivery of data to and from the client devices.

SUMMARY

In general, techniques are described by which intermediate network devices within a network perform route resolution and path selection based on information that describes network acceleration services offered by network acceleration devices deployed throughout the network, such as standalone Wide Area Network (WAN) acceleration (X) devices (which may be referred to as "WX devices") and routers having integrated network acceleration devices. This service-aware path selection may be achieved by the network acceleration devices exchanging network acceleration service information that describes the type of acceleration services provided by each respective one of the devices. Moreover, the network acceleration devices may exchange information describing their individual amount of resources available to provide the services, e.g., a number of connections to which acceleration services may be applied as defined by a license, hardware capabilities, software versions, and the like. The information may also describe the current utilization of those resources with respect to acceleration services, e.g., a number of connections to which the acceleration services are currently being applied. In this respect, each network device may receive network acceleration service information that describes both the network acceleration services each device provides and the available bandwidth or resource utilization currently available by each respective device to provide the indicated services. The network acceleration devices may implement a modified routing protocol so as to opaquely embed the service information in routing communications exchanged by way of a routing communication session.

Upon exchanging the service information, each network acceleration device within the network may maintain a database detailing service information for each network acceleration device within the network or network system. The collection of service information may be organized in the form of a service topology representing the network acceleration devices and their differing acceleration services. Each network acceleration device utilizes the database of service information and the defined service information topology when performing route resolution and selection of paths through the network along which to forward traffic. Based on the service topology, for example, each network device may form adjacencies with other acceleration devices so as to engineer traffic paths through the network that flow through particular network acceleration devices, thereby allowing the network acceleration devices along to path to apply the desired acceleration services to network traffic. Moreover, the path selection may be based on the type of network acceleration services applied by the different network acceleration devices relative to the particular type of traffic, as well as, the acceleration services provided by the network acceleration device selecting the path. Path selection may also be based on the current utilization of the resources of each network acceleration device to provide a certain amount or form of load balancing.

As a result, the network acceleration devices may perform constraint-based routing to actively select a path through the network by which to forward traffic so as to facilitate the application of acceleration services. Considering that application of acceleration services often requires a pair of network acceleration devices to cooperate, e.g., one device to compress the traffic and another device to decompress the traffic, the techniques may select a path between these pairs so as to ensure the pair of network acceleration devices provides at least one common acceleration service by which to accelerate traffic. In this respect, rather than select a path based solely on a number of hops or some other conventional path selection criteria that may lead to randomly assigned pairs or adjacencies of network acceleration devices, the techniques may enable network acceleration devices to actively select a path that includes one or more pairs of network acceleration devices that share at least one network acceleration service.

Moreover, the path selection techniques may base path selection on the type of traffic and whether the shared service applies to the particular type of traffic. Further still, the service-aware path selection techniques may base path selection on the resource utilization and therefore provide a form of load balancing so as to ensure adequate utilization, e.g., neither over-utilization nor under-utilization, of network acceleration devices. The techniques may also enable network administrators to more freely deploy network acceleration devices within the network, as these devices (either dynamically or via administrator configuration) may perform traffic engineering based, not only on link connectivity information (e.g., link state or learned routes), but on the learned service information as well. The network acceleration devices, again by virtue of utilizing service information during path selection, may select a path through multiple network acceleration devices that provide different types of acceleration services so as to layer application of two or more acceleration services.

In operation, a router may comprise an integrated network acceleration device that includes a service engine. The router may be viewed as logically having three different functional planes, a forwarding plane for forwarding packets, a routing plane for executing routing sessions and maintaining a routing topology of the network, and a service plane for providing additional services to the packets. A control unit or other processing unit may implement both the forwarding and the routing planes. The service plane may be coupled to the routing plane via a switch or other form of high-speed backplane, where the service plane may include one or more service cards. The service card, in this instance, may implement the integrated network acceleration device and may be referred to as a "WX service card" for this reason. The WX service card may comprise or implement the service engine that applies one or more network acceleration services. While described herein with respect to a router having an integrated network acceleration device, the techniques may also apply to stand-alone network acceleration devices, such as stand-alone WX devices, and should not be limited to the exemplary embodiments set forth below.

Initially, the routing engine implemented by the control unit may determine first service information that describes a first set of acceleration services provided by a first service engine included within the WX service card. The routing engine may implement a so-called "service" Application Programming Interface (API) to communicate with the service plane and determine the service information. The routing engine, meanwhile, may also receive second service information that describes a second set of acceleration services provided by a second service engine included within a different adjacent or second router. The routing engine may implement one or more protocols of a class of protocols referred to as Interior Gateway Protocols (IGPs) by which to receive this second service information. For example, the routing engine may implement an Open-Shortest Path First (OSPF) protocol by which to receive this second service information.

Specifically, the routing engine may receive this second service information via a Link State Advertisement (LSA) in accordance with the implemented one or more IGPs, such as OSPF. This LSA may include the second service information as opaque information, which as the name suggests may refer to information that is hidden from those network devices within the network that do not understand the service information. For this reason, the LSA may be referred to as an "opaque LSA." In any event, the routing engine may store both the first and second service information to a database included within the routing engine as the above described service topology. The routing engine may also receive other LSAs, opaque or otherwise, in accordance with the one or more implemented IGPs, such as OSPF, that include link information describing a state of each link within the network, as well as, possibly an available bandwidth of each link, which may be used for traffic engineering purposes. This routing engine may store this link information to this or another database as a network topology.

After performing this initial initialization phase whereby the routing engine determines and stores both the service and the network topology, the routing engine may enable the forwarding plane to begin receiving packets. The forwarding plane may comprise one or more interface cards, also coupled to the control unit by the switch or other high-speed backplane, that receive a packet, which includes a destination to which the packet is destined. The control unit may implement the forwarding plane as a forwarding engine comprised of a flow control unit. The flow control unit may determine a flow to which the packet corresponds. If determined to be a new flow, e.g., a flow for which the flow control unit has not yet received a packet, the flow control unit forwards the packet to the routing engine, which classifies the packet to determine an application to which the packet corresponds. An application as used herein refers to a protocol of Layer 7 (L7) of the Open System Interconnect (OSI) model, such as a HyperText Transfer Protocol (HTTP), a Session Initiation Protocol (SIP), or a File Transfer Protocol (FTP). While described herein as classifying the packet as corresponding to a particular application, the routing engine may classify the packet as corresponding to any type of packet, wherein the type may refer to a L3 protocol, a particular pattern or any other classifiable characteristic of the packet.

Upon classifying the packet, the routing engine may then identify at least one of the first set of accelerations services to apply to the packet based on the determined application to which the packet corresponds. The routing engine may maintain a service configuration that is keyed by application types and the routing engine may access the service configuration to determine the at least one of the first set of acceleration services. This service configuration may be input by an administrator or other network user. The routing engine, using the identified at least one of the set of network acceleration services as a key, determine whether the second set of acceleration services described by the second service information shares the identified at least one of the first set of acceleration services. In other words, the routing engine may attempt to pair the integrated WX service card with the second router, or more particularly, the second WX service card integrated within the second router. In the respect, the routing engine of the first router may intelligently select WX device adjacencies based on the service information.

Based on a determination that the second router shares at least one service in common with the identified at least one services described by the first service information, the routing engine may select a path through the network that includes the second router. The routing engine may, in order to select the path, provide an address associated with the second router to the one or more IGP protocols, which may perform a form of "loose" constraint based path selection to select the path through the second router. The routing engine may then, again via the service API, communicate with the WX service card to request that the WX service card negotiate a service connection over which the WX service cards of both the first and second routers may apply the determined one or more shared or common services.

Upon successfully negotiating the service connection, the routing engine may forward the packet back to the forwarding plane along with an update indicating to the forwarding plane that it should forward all packets associated with the same flow as that of the returned packet to the service plane. The update may also specify the one or more shared services. The forwarding plane may then forward the packet to the WX service card along with an indication of the one or more shared services, whereupon the first service engine may apply the indicated one or more shared services to the packet in order to accelerate delivery of the packet. The service card may then forward the accelerated packet back to the forwarding plane, which may, in turn, forward the accelerated packet along the determined path such that the second service engine included within the second WX service card of the second router applies the at least one shared acceleration service to reconstruct, from the accelerated packet, the packet forwarded via the path. In this manner, the router may intelligently select WX service adjacencies based on service information in order to perform service-aware path selection by which to more efficiently apply shared or common services rather than rely on conventional path selection techniques and correct placement of network acceleration devices to ensure efficient application of services.

In one embodiment, a method comprises determining, with a first router, first service information that describes a first set of acceleration services provided by a first service engine included within the first router, receiving, with the first router, a routing protocol message having second service information that describes a second set of acceleration services provided by a second service engine included within a second router, receiving, with the first router, a packet, wherein the packet identifies a destination to which the packet is destined and classifying, with the first router, the packet to determine a software application to which the packet corresponds. The method further comprises identifying, with the first router, at least one of the first set of accelerations services to apply to the packet based on the determined application to which the packet corresponds, determining, with the first router, whether the second set of acceleration services described by the second service information shares the identified at least one of the first set of acceleration services, based on the determination, invoking a protocol on the first router to select a path through the network that includes the second router, wherein the path includes a plurality of next hops from the first router to the destination, and wherein the first router selects the path through the network so that the second router is positioned along the path between the first router and the destination, based on the determination, applying, with the first service engine of the first router, the at least one shared acceleration service to the packet in order to accelerate delivery of the packet, and forwarding, with the first router, the accelerated packet along the determined path such that the second service engine of the second router along the path applies the at least one shared acceleration service to reconstruct, from the accelerated packet, the packet forwarded via the path.

In another embodiment, a first router included within a network comprises a first service engine that provides a first set of acceleration services, a control unit that determines first service information that describes the first set of acceleration services provided by the first service engine, and at least one interface card that receives a routing protocol message having second service information that describes a second set of acceleration services provided by a second service engine included within a second router and receives a packet that identifies a destination to which the packet is destined. The control unit further classifies the packet to determine a software application to which the packet corresponds, identifies at least one of the first set of accelerations services to apply to the packet based on the determined application to which the packet corresponds, determines whether the second set of acceleration services described by the second service information shares the identified at least one of the first set of acceleration services, and invokes, based on the determination, a protocol on the first router to select a path through the network that includes the other router, wherein the path includes a plurality of next hops from the router to the destination, and wherein the router selects the path through the network so that the other router is positioned along the path between the router and the destination. The first service engine applies the at least one shared acceleration service to the packet in order to accelerate delivery of the packet. The at least one interface card forwards the accelerated packet along the determined path such that the second service engine of the second router along the path applies the at least one shared acceleration service to reconstruct, from the accelerated packet, the packet forwarded via the path.

In another embodiment, a network system comprises a first network that includes a first router, wherein the first router includes a first service engine that provides a first set of acceleration services and a control unit that determines first service information that describes the first set of acceleration services provided by the first service engine. The network system further includes a second network that includes a second router, wherein the second router includes a second service engine that provides a second set of acceleration services. The first router further includes at least one interface card that receives a routing protocol message having second service information that describes the second set of acceleration services provided by the second service engine included within the second router and receives a packet that identifies a destination to which the packet is destined. The control unit further classifies the packet to determine a software application to which the packet corresponds, identifies at least one of the first set of accelerations services to apply to the packet based on the determined application to which the packet corresponds, determines whether the second set of acceleration services described by the second service information shares the identified at least one of the first set of acceleration services, and invokes, based on the determination, a protocol on the first router to select a path through the network that includes the other router, wherein the path includes a plurality of next hops from the router to the destination, and wherein the router selects the path through the network so that the other router is positioned along the path between the router and the destination. The first service engine applies the at least one shared acceleration service to the packet in order to accelerate delivery of the packet. The at least one interface card forwards the accelerated packet along the determined path such that the second service engine of the second router along the path applies the at least one shared acceleration service to reconstruct, from the accelerated packet, the packet forwarded via the path.

In another embodiment, a computer-readable medium comprising instructions for causing a programmable processor to determine, with a first router, first service information that describes a first set of acceleration services provided by a first service engine included within the first router, receive, with the first router, a routing protocol message having second service information that describes a second set of acceleration services provided by a second service engine included within a second router, receive, with the first router, a packet, wherein the packet identifies a destination to which the packet is destined, classify, with the first router, the packet to determine a software application to which the packet corresponds, and identify, with the first router, at least one of the first set of accelerations services to apply to the packet based on the determined application to which the packet corresponds. The instructions further cause the processor to determine, with the first router, whether the second set of acceleration services described by the second service information shares the identified at least one of the first set of acceleration services, based on the determination, invoke a protocol on the first router to select a path through the network that includes the second router, wherein the path includes a plurality of next hops from the first router to the destination, and wherein the first router selects the path through the network so that the second router is positioned along the path between the first router and the destination, based on the determination, apply, with the first service engine of the first router, the at least one shared acceleration service to the packet in order to accelerate delivery of the packet, and forward, with the first router, the accelerated packet along the determined path such that the second service engine of the second router along the path applies the at least one shared acceleration service to reconstruct, from the accelerated packet, the packet forwarded via the path.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
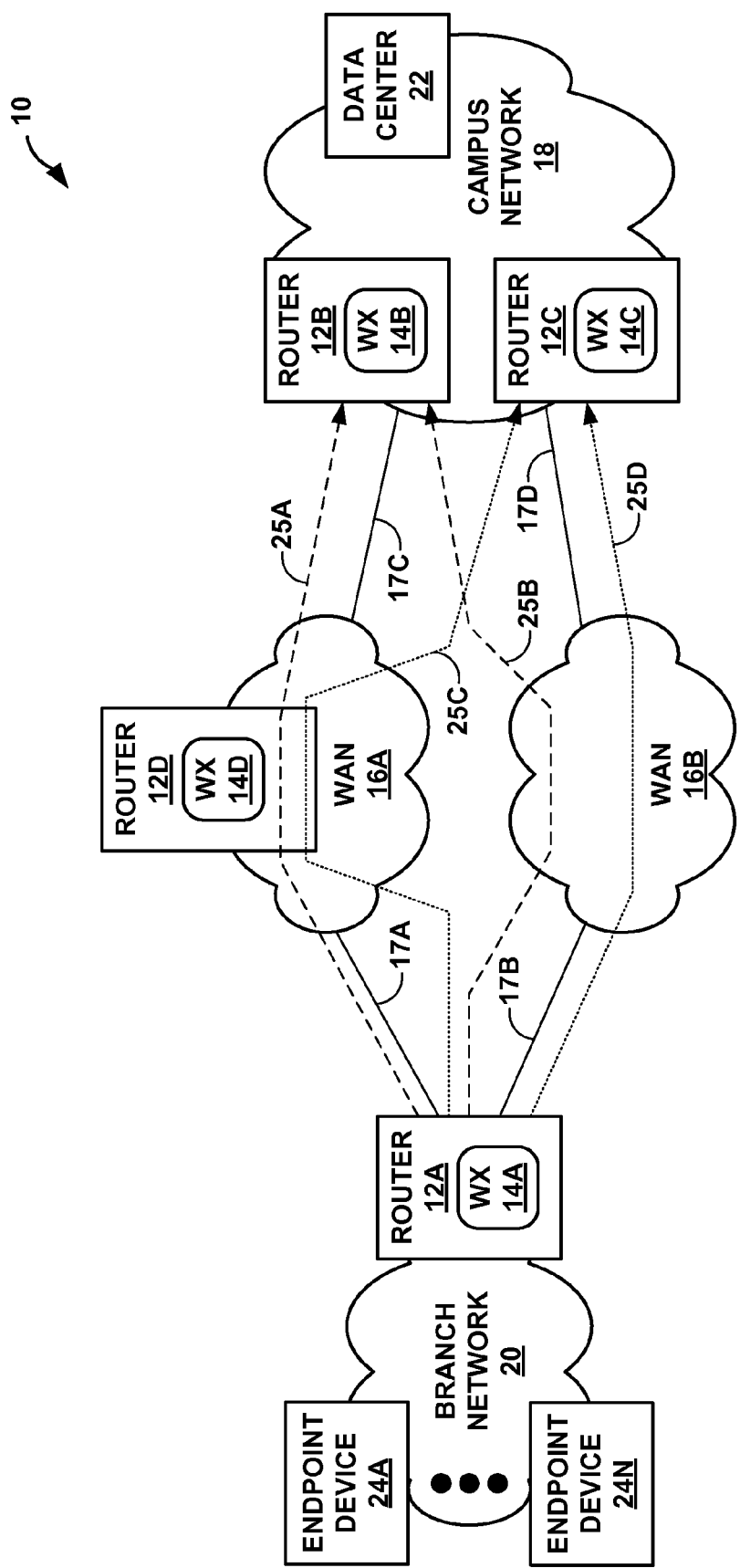
FIG. 1 is a block diagram illustrating an exemplary network system in which a router implements the service-aware path selection techniques described in this disclosure.

FIG. 1 is a block diagram illustrating an exemplary network system 10 in which a router 12A implements the service-aware path selection techniques described in this disclosure. While described herein with respect to a particular intermediate network device, e.g., router 12A, the techniques may be implemented by any network device, including a router or any other network device capable of performing path, route, next hop, or link selection. For example, the techniques could be applied by routers 12B, 12C and/or 12D instead of or in conjunction with router 12A.

As shown in FIG. 1, network system 10 includes a plurality of routers 12A-12D ("routers 12"), each of which includes an integrated network acceleration device, such as at least one service card that provides network acceleration services. FIG. 1 illustrates this integrated network acceleration device as Wide Area Network (WAN) acceleration (X) devices 14A-14D ("WXs 14") included within respective ones of routers 12. While described with respect to a router generally, in some instances, the techniques may be implemented by dedicated or stand-alone network acceleration devices separate from a router or other similar network device, such as a stand-alone Wide Area Network (WAN) acceleration (X) device or "WX device" for short. In these instances however, it should be noted that the WX device may perform routing functions and therefore may represent a router having an integrated acceleration device. As a result, while applicable to dedicated network acceleration devices, the techniques are described below with respect to routers having an integrated network acceleration device in the form of a service card for ease of illustration purposes, although the techniques may apply to stand-alone WX devices that provide reduced or limited routing functions to select paths through the network.

Referring again to FIG. 1, router 12A couples to each of Wide Area Networks 16A, 16B ("WANs 16") via links 17A, 17B, respectively. Each of Routers 12B and 12C also couple to each of WANs 16A, 16B via links 17C, 17D, respectively. WANs 16 may each comprise a public or private network that is available for lease or purchase by private entities or businesses so as to couple remote locations and/or networks together. Although not shown in FIG. 1 for ease of illustration purposes, WANs 16 may provide access to a public network, which may include any publicly accessible network, such as the Internet. Typically, the public network comprises a packet-based network that transmits packets according to an Internet Protocol (IP)/Transmission Control Protocol (TCP).

Router 12A resides at the edge of a remote or branch network 20. Likewise, routers 12B, 12C each resides at the edge of an enterprise or campus network 18. Branch network 20 may represent a small network used by a remote location or office of a large enterprise or business. Branch network 20 may comprise a local area network (LAN) that operates according to one of the family of Institute of Electrical and Electronics Engineers (IEEE) 802.X Ethernet standards. Campus network 18 may represent a larger network used by the main office or location of the large enterprise or business. Campus network 18 may also comprise a LAN that operates according to one of the family of IEEE 802.X Ethernet standards. Typically, data and other resources, such as templates, documents, manuals, accounting figures, employee information, applications, and any other information or application pertinent to operation of both the remote and main offices of the large enterprise, are stored in a centralized location.

Campus network 18 also includes a data center 22, which may provide a centralized location for the storage of the above described data, applications, and other resources. Data center 22 may represent a plurality of servers, which may each store in a centralized fashion the above described data, applications, and other resources. This data and other resources may be referred to herein generally as "content." That is, data center 22 may include one or more data servers, web servers, application servers, databases, computer clusters, mainframe computers, and any other type of server, computing element, and/or database commonly employed by an enterprise or business to facilitate the operation of the enterprise or business. These servers and/or databases may comprise "blades" or other cards that are inserted into large racks. The racks may provide a common backplane or switch fabric to interconnect the various servers and/or databases to one another, as well as, to campus network 18.

Data center 22 may support one or more of a variety of protocols or software interfaces by which these servers of data center 22 may serve the content. Exemplary protocols or software interfaces include a HyperText Transfer Protocol (HTTP), a Common Internet File System (CIFS) protocol, a File Transfer Protocol (FTP), a Secure Socket Layer (SSL) protocol, a Messaging Application Programming Interface (MAPI), a Transmission Control Protocol (TCP), and a Session Initiation Protocol (SIP).

By connecting to campus network 18, data center 22 may be accessible by any devices included within campus network 18 and any devices, e.g., one or more of a plurality of endpoint devices 24A-24N ("endpoint devices 24"), of branch network 20. Each of endpoint devices 24 may comprise a laptop computer, a desktop computer, a workstation, a mainframe computer, a personal digital assistant (PDA), a cellular phone, a smart phone, or any other device capable of accessing a network. Campus network 18 may provide such a centralized location for the storage of data, applications, or other computing resources to reduce costs associated with distributed data storage.

Distributed data storage architectures typically required each location to maintain its own separate database or server for use in storing data pertinent to each respective location. For example, assuming, for purposes of illustration, that campus and branch networks 18 and 20 implemented distributed data storage, branch network 20 may also have included a remote data center, e.g., servers similar to data center 22, for storing data and other resources or content pertinent to the operation of the branch office. In this distributed data storage example, data center 22 would usually only store and serve content pertinent to the operation of campus network 18.

As network infrastructure lies in both of networks 18 and 20, the enterprise or business may be required to have dedicated Information Technology (IT) staff at both the remote location, e.g., the branch office, and the main location, e.g., the main office, to service both the remote and central data centers, which may increase expenses. Even if no dedicated IT staff is provided for servicing the remote data center, the enterprise may be required to send IT staff to the remote location, e.g., branch network 20, to service the remote servers, which may increase costs and otherwise impinge upon the operation of the branch office. Moreover, issues, e.g., data loss, may arise when the data and other resource or, more generally, the content of branch network 20 needs to be synchronized with content stored to data center 22 of the main office or campus.

Centralized storage of the content, however, reduces, if not eliminates many of these issues by placing all of the equipment necessary for data storage within a centralized location that is easily accessible by a dedicated and centrally located IT staff. Furthermore, as a result of next generation Internet network acceleration services and web development, centrally located data center 22 may serve web-based applications that enable remote users to access data and other resources stored to data center 22 through a web-browser executed by each of endpoint devices 24. Because only a web-browser is required, branch offices may no longer require dedicated IT staff on site. Moreover, because content may be deployed remotely, the IT staff need not travel to the remote office. Again, by virtue of centralizing the content, IT costs may be significantly reduced. As a result, centralized data centers, such as those in which data centers 22 may each resides, are setting the standard by which large enterprises or businesses store and maintain data, as well as, remotely distribute new and update old applications.

While centralized storage of content may decrease costs, this centralized architecture typically requires that branch network 20 maintain access to campus network 18. Commonly, large enterprises or businesses may lease or purchase a dedicated line or connection that couples branch network 20 and campus network 18 together to ensure privacy or otherwise prevent unauthorized access to networks 18 and 20. A network service provider may lease or sell this line to the enterprise or business and usually charges various prices depending on the speed and/or bandwidth of the line. For example, a service provider may offer for lease a digital signal 1 ("DS1") or T-carrier 1 ("T1") line (e.g., a dedicated line having 1.536 mega-bits per second of bandwidth) for a first price per month and a DS3 or T3 line (e.g., a dedicated line having 44.736 mega-bits per second of bandwidth) for a second, higher price per month. Depending on the bandwidth required between branch network 20 and campus network 18, the enterprise or business may choose either to purchase one or more of either or both the T1 or T3 line.

For purposes of illustration, it is assumed that links 17A-17D ("links 17") are leased or purchased from one or more network service providers that own and operate WANs 16, e.g., the above mentioned AT&T and Verizon. Notably, the term "link" may used herein to refer to the physical connection (such as the cables or other communications mediums running between one or more central offices of WANs 16 and networks 18, 20), while "line" refers to a service (such as a T1 line or T3 line) carried by the link. Often, however, the terms are used interchangeably as a T1 or T3 line generally accompanies the leasing of one or more links. That is, a customer may request a T1 line service and, as part of that service, the service provider leases a dedicated link to the customer as part of providing the T1 line service. As a result, links 17 may also be referred to herein as "lines 17."

Considering that bandwidth concerns may, in part, control the selection of lines, the business or enterprise may attempt to reduce the bandwidth required between branch network 20 and campus network 18 in order to, again, reduce costs by enabling the enterprise to subscribe to a line that provides (and lease a link capable of supporting) less bandwidth. To this end, branch network 20 and campus network 18 may update one or more respective intermediate network devices, e.g., routers 12A-12C, with an integrated network acceleration device, e.g., WXs 14A-14C, to reduce bandwidth consumption through application of one or more network acceleration services to traffic traversing WANs 16.

Network acceleration services may include any action by WXs 14A-14C to improve performance of network system 10, e.g., by reducing bandwidth consumption and thereby increase available bandwidth. In other words, network acceleration services may include, for example, caching of content, compressing packets or other discrete data units of the network traffic, application acceleration, or any combination of the above, as well as, any other action that improves network performance. Example data compression network acceleration techniques are described in U.S. Pat. No. 7,167,593, entitled "SYSTEM AND METHOD FOR INCREMENTAL AND CONTINUOUS DATA COMPRESSION", issued Jan. 23, 2007, incorporated herein by reference.

These integrated network acceleration devices, e.g., WXs 14A-14C, may represent proxy devices that divide each TCP or other protocol sessions into three discreet TCP session: (1) a first TCP session having terminations at an endpoint device 24 and WX 14A, (2) a second TCP session having terminations at WX 14A and WXs 14B for example, and (3) a third TCP session having terminations at either of WXs 14B and data center 22. In this respect, WXs 14 may represent TCP proxies that apply network acceleration services to the second or intermediate TCP session. The various TCP sessions may therefore represent TCP tunnels between the various devices.

That is, endpoint device 24A may intend to establish a single TCP session with a particular destination, e.g., a server of data center 22, by which to access content stored to that destination. WX 14A may intercept this TCP session request and reply to the session as if WX 14A was the intended destination, thereby establishing the first TCP session or tunnel of the three. WX 14A may then establish a second or intermediate TCP session with WX 14B, which may then establish a third TCP session with data center 22. As a separate TCP session exits between WXs 14A, 14B, these WXs 14A, 14B may apply network acceleration services to optimize delivery of data and traffic destined for and received from data center 22 without interfering with the first and second TCP sessions.

The integrated network acceleration devices, e.g., WXs 14A, 14B, may, for example, locally cache content previously requested by a client device, such as one or more of endpoint devices 24, in order to optimize (or reduce if not eliminate) bandwidth consumption directed to subsequent requests for the same data. That is, WX 14A may, instead of issuing the request for the same content previously requested possibly by another one of client devices 24 and thereby consuming bandwidth, cache the previously requested content and, without sending the request to data center 22 or the public network, service the request using the locally cached content, thereby preserving bandwidth.

The intermediate network devices, e.g., WXs 14A, 14B, may also communicate with one another via the second TCP session so as to optimize or compress traffic, and thereby reduce bandwidth consumption, by replacing identified sequences of data with, for example, symbols, where the symbols represent the respective identified sequences using fewer bits. Often, these compression services require pairs of WX devices, such as WXs 14A, 14B, where one compresses the traffic and the other un-compresses the traffic. WX 14A may, for example, apply a compression service that compresses the network traffic according to one of a plurality of compression algorithms, while WX 14B applies the same compression service to uncompress the traffic. Each of the plurality of compression algorithms may be tailored to a specific type of layer seven (L7) network application, e.g., a HyperText Transfer Protocol (HTTP) application, Skype, Telnet, FTP or a specific transport layer protocol (TCP) and each may represent a particular compression service. Consequently, different network acceleration devices (WXs 14) may apply different acceleration services for different types of network traffic.

WXs 14A, 14B may also apply an application-specific acceleration service having a particular algorithm designed to accelerate or optimize the retrieval of content for a specific network application. For example, an HTTP acceleration service may enable more efficient retrieval of HyperText Markup Language (HTML) pages. Typically, each HTML page comprises a plurality of objects, e.g., images, templates, Java Scripts, etc., and WX 14A may apply an HTTP acceleration service to each HTML request to more efficiently download the plurality of objects, thereby "accelerating" the retrieval of HTML pages requested via HTTP.

To determine an application to which each packet belongs, integrated network acceleration devices 14A, 14B may classify each packet of the network traffic as belonging to a particular application and/or protocol and apply one or more corresponding network acceleration services (e.g., caching, compression, or application-specific acceleration) to improve network performance. In this manner, WXs 14 may apply network acceleration services to improve the performance of network system 10.

In the example of FIG. 1, WX 14A may communicate with WX 14B via one of a plurality of paths 25A, 25B to apply network acceleration services. A "path," as used herein, may refer to one or more links, such as links 17, by which an intermediate network device may connect to another intermediate network device. For example, path 25B comprises a direct connection between WX 14A to WX 14B via links 17B, 17D. Path 25A comprises an indirect connection between WX 14A to WX 14B, as a third intermediate network device, e.g., router 12D, lies along path 25A between WX 14A and WX 14B. Path 25A may be referred to as a "connecting path" in that path 25A comprises at least one connecting hop through a third intermediate network acceleration device 14D positioned between WXs 14A, 14B. Path 25A may also be referred to as an "indirect path" for similar reasons. Path 25B may be referred as a "direct path" in that WX 14A couples directly (e.g., without connecting or coupling to any intervening third network acceleration devices) to WX 14B.

That is, path 25A may represent a path through a WAN in which at least one intermediate network acceleration device capable of applying optimization or network acceleration services lies. Path 25A, for example, may comprise a path through WAN 16A in which WX 14A couples to WX 14D via link 17A and WX 14D couples to WX 14B via link 17C. As application of services may require pairs of WX devices, a path may comprise one or more pairs of WX devices, where each pair applies a different set of network optimization or acceleration services. Path 25A, for example, may comprise a first pair of intermediate network acceleration devices, e.g., WX 14A and WX 14D, applying a first set of services and a second pair of intermediate network acceleration devices, e.g., WX 14D and WX 14B, applying a second set of services. WX 14D may apply substantially similar set or different set of optimization or network acceleration services to those described above with respect to WXs 14A, 14B. While shown as only comprising a path having one connecting hop to a single intermediate network acceleration device or WX 14D, path 25A may comprise a plurality of connecting hops to a plurality of intermediate network acceleration devices similar to that of WX 14D, where each pair of intermediate network acceleration devices may apply one or more network optimization or acceleration services.

Path 25B, however, may represent a path through a WAN, or other network, in which a first network acceleration device and a second intermediate network device directly couple to one another without any other intermediate network acceleration device lying along the path. That is, path 25B may, as shown in the example of FIG. 1, comprise a path through WAN 16B in which WX 14A couples to WX 14B directly via links 17B, 17D. While shown as comprising two links, path 25B may comprise any number of links so long as none of those links route through an intermediate network acceleration device similar to that of WX 14D capable of providing network acceleration services, otherwise, path 25B may not be representative of a "direct" path.

As further shown in the example of FIG. 1, WX 14A may also couple to WX 14C via one or more of paths 25C, 25D. Path 25C may be similar to path 25A in that path 25C represents an indirect or connecting path by which WX 14A connects to WX 14C via the same connecting hop of WX 14D. Path 25D may be similar to path 24B in that path 24D represents a direct path connecting WX 14A to WX 14C without any intervening connecting hop involving an intermediate network acceleration device.

Generally, these paths 25 may each comprise one or more "hops" arranged in a series, where a "hop" refers to a traversal of a single link along the path. In other words, each of paths 25 may comprise one or more links from a given source to a given destination within network system 10. Each hop of paths 25 may identify, usually by an address, a network device that terminates each link included within the path. Routers 12 may implement a routing protocol to select these paths through the network by communicating information concerning these hops or the links interconnecting the hops to one another.

For example, in accordance with a class of routing protocols referred to as "link state routing protocols," routers 12 may exchange information concerning states of links to which each of routers 12 couple. An example link state protocol may include an Open Shortest Path First (OSPF) routing protocol. In accordance with the OSPF routing protocol, routers 12 may exchange Link State Advertisements (LSAs) that describe the state of these links to which each of routers 12 couple.

An exemplary LSA may describe the state of each link by specifying link state information that includes information concerning a destination or "next hop" reached by the link, a cost associated with each link (e.g., bandwidth each link supports), as well as, whether the link is up (e.g., active) or down (e.g., inactive). Routers 12 may propagate the LSA from one another such that each of routers 12 may maintain link state information concerning all of the links within network 10.

From this link state information, routers 12 may construct a topology of network system 10. This topology constructed based on the link state information may be referred to as a "network link topology" or simply, "link topology" or "network topology." The network topology may comprise a graph data structure, whereby each link forms a corresponding edge of the graph and each destination or hop to which each link connects forms a node of the graph. Routing devices, such as routers 12, may maintain this network or link topology in a database.

Routers 12 may utilize this link topology to resolve paths through network 10 by traversing the graph data structure and selecting the series of one or more hops that form the path. Often, when resolving paths, hops may be referred to as the "next hop" in that a path may be resolved by iteratively selecting, from a given source, the "next hop" along the path until a given destination is reached. In accordance with the OSPF routing protocol, routers 12 may resolve paths through network system 10 by traversing the graph to construct a shortest path tree data structure using a method derived from Dijkstra's algorithm. A shortest path tree data structure may represent a sub-graph of the graph or network topology that is constructed such that the distance between the selected node, e.g., one of routers 12, and the one of routers 12 constructing the short path tree is minimal. While constructing the shortest path tree, each of routers 12 may prefer paths with lower associated costs to resolve any two or more paths that comprise the same distance to one of the other nodes. That is, if two paths between the selected node and one of the other nodes comprise the same distance, e.g., number of hops, the path to the one of the nodes may be resolved by selecting the path with the lowest overall cost.

One or more of routers 12 may also implement an extension to the routing protocol that facilitates traffic engineering. Traffic engineering refers to a process whereby dynamic properties are considered during the path selection process. For example, a Traffic Engineering (TE) extension to the OSPF protocol, with the combined result referred to commonly as an OSPF-TE routing protocol, may facilitate traffic engineering within the OSPF protocol. Typically, those of routers 12 that implement the OSPF-TE protocol transmit these dynamic link properties, such as a maximum reservable bandwidth property, a reserved bandwidth property, and/or an available bandwidth property, via an opaque LSA. An "opaque LSA" refers to an LSA that includes fields of information for a particular extension of a link state protocol, such as the TE extension, where those network devices that do not implement the extension may opaquely forward the information particular to the extension without otherwise processing or acknowledging the presence of this information in the LSA.

Regardless of how these dynamic link properties are communicated, those of routers 12 that implement the OSPF-TE protocol may dynamically update the network topology based on these dynamic link properties. These routers 12 may then engineer the forwarding of traffic by selecting paths through network system 10 based on the current state of the links as represented by the dynamic link properties. If a link for example along a selected path becomes congested, e.g., the available bandwidth property for that link indicates a low available bandwidth, those of routers 12 that implement the OSPF-TE protocol may reroute one or more paths around the congested link to alleviate the congestion and thereby dynamically improve performance with network system 10. In this manner, those of routers 12 that implement the OSPF-TE protocol may perform "traffic engineering" based on dynamic link properties to alleviate congestion within network system 10.

In accordance with the principles of the invention, one or more of routers 12 may perform the service-aware path selection techniques to generally select paths through network system 10 based on service information that describes network acceleration services provided by one or more of integrated WX devices 14. These service-aware path selection techniques may augment standard path selection of the routing protocol, as describe above, such that those of routers 12 that implement the service-aware path selection may perform constraint-based routing to select paths based not only on the link state information (as represented by the network topology) but also on the network acceleration service information. In this respect, routers 12 may become "aware" of services provided along each of paths 25 through the network system and are able to select paths such that one or more integrated network acceleration devices 14 apply network acceleration services to network traffic traveling the particular path.

For example, a first network device, such as router 12A, may receive service information that describes a set of one or more network acceleration services provided by a network acceleration device 14B integrated within router 12B of campus network 18. WX device 14B, as described above, is integrated within a second router, router 12B, different from router 12A. This service information may include an identifier assigned to either WX 14B or router 12B, such as an IP address or Media Access Control (MAC) address, and one or more of the above described network acceleration services provided by WX 14B. Router 12A may receive this service information using a link state protocol, such as the above described OSPF protocol, that has been extended in accordance with the techniques described herein so as to include the additional network acceleration service information. Moreover, router 12A may receive this service information via an opaque LSA, where the service information is embedded within an opaque field of the opaque LSA, similar to the dynamic link properties described above. This opaque LSA that includes service information in an opaque field may be generally referred to herein as a "service LSA." More specifically, as this service LSA provides information concerning network acceleration services, this LSA may be referred to as an "acceleration service LSA" or a "network acceleration service LSA."

Router 12A may then, upon receiving this security information via the service LSA, construct a service table that comprises a plurality of entries, one for each of the plurality of WX devices 14. This table, in other words, may include an entry for WX 14A that is integrated within router 12A. In this respect, a routing engine or other control component or control unit of router 12A may poll or otherwise determine a set of one or more network acceleration services provided by WX 14A integrated within router 12A. This aspect of the invention is described below in more detail with respect to FIG. 2. Briefly, however, the routing engine of router 12A may, for example, implement an Application Programmer Interface (API) by which to interface with WX 14A, where one such API function or command may enable the routing engine to poll or otherwise determine the set of network acceleration services provided by WX 14A integrated within router 12A. Router 12A, upon learning or otherwise determining this set of network acceleration services may store this service information to a corresponding entry of the "service" table.

Accordingly, each entry may store service information for a corresponding one of the plurality of WX devices 14. This service table may represent a "service topology" or "network acceleration service topology" that defines the services, resources and location of devices within the network that are capable of providing network acceleration services. Router 12A may maintain the service topology as an additional layer of information on top of the network topology. Router 12A may utilize the service topology in conjunction with the network topology to determine and then select one of paths 25 through the network. For example, the service information is injected into the routing protocol as a constraint for inclusion within constraint-based routing and path selection.

Once selected, router 12A may determine whether the selected path exists and, if not, establish the path via a protocol, such as a Multi-Protocol Label Switching (MPLS) signaling protocol or a proprietary point-to-point path signaling protocol. Examples of MPLS signaling protocols include a Label Distribution Protocol (LDP) and a resource reservation protocol (RSVP). In LDP, the established path is referred to as a "Label Switched Path" or "LSP," and paths 25, as shown in FIG. 1, may be referred to as LSPs 25A-25D ("LSPs 25"). LSPs 25 may also be generally referred to as a Multi-Protocol Label Switched (MPLS) path, as LDP comprises one protocol of the suite of MPLS protocols.

As shown in FIG. 1, router 12A may determine or select paths 25 through network system 10 based on the service topology. Router 12A may, in some instances, determine or select one or more of paths 25 dynamically, automatically, or without administrative input by overlaying the service information or topology on top of the network topology and thereby leverage the path selection process of the traffic engineering protocols, such as the OSPF-TE protocol, to perform the service-aware path selection techniques described herein. Alternatively or in conjunction with this dynamic path selection, one or more of paths 25 may be configured or provisioned statically by an administrator. Often, one or more of paths 25 are dynamically determined, such as path 25A, while another path, such as path 25B, is statically provisioned as a backup to path 25A (thereby possibly providing so-called "high availability").

In instances where paths 25 are dynamically determined, router 12A may determine or select one of paths 25 based on service information learned from each of routers 12B-12D concerning one or more network acceleration services provided by WX devices 14B-14D integrated within respective edge routers 12B-12D. Router 12A may also determine or select this one of paths 25 based on service information determined for its own integrated WX 14A. Router 12A may select one of paths 25 based on both the service information determined for or learned from WX 14A and the service information learned from each of router 12B-12D due to the paired nature of network acceleration services described above. That is, network acceleration services often require a pair of WXs 14 to cooperate in order to successfully accelerate network traffic via the intermediate or second TCP connections represented by paths 25.

As a result, router 12A may first determine the set of network acceleration services provided by WX 12A. Next, router 12A may access the service table or database to determine whether the set of acceleration services provided by WX 14A shares at least one acceleration service in common with the set of acceleration services provided by each respective one of WXs 14B-14D. If no network acceleration services are shared between WX 14A and one of WXs 14B-14D currently being analyzed, router 12A may eliminate the corresponding one of routers 12B-12D. If, however, one of WXs 14B-14D currently under analysis shares at least one network acceleration service in common with WX 14A, router 12A may store or otherwise identify these "common" WX devices. Router 12A may, for example, store an IP address of those routers 12B-12D in which these common ones of WXs 14B-14D are integrated.

Router 12A may then return one or more addresses identifying one or more of routers 12B-12D that satisfy this common network acceleration service criteria. In some instances, the service information maintained by router 12A may indicate an available bandwidth property or some other dynamic property, similar to those described above for the OSPF-TE extension, related to the utilization of each of the plurality of WXs 14. For example, the service information learned for each of WXs 14 may define total resources as a number of connections to which network acceleration services may be applied by the corresponding one of WXs 14 (e.g., as defined by a license) and the utilization of those resources as a number of connections to which the corresponding one of the network acceleration services are currently being applied by the corresponding one of the WXs 14. Router 12A may then select one or more routers 12B-12D through which to route network traffic based not only on the network acceleration services provided by each of WXs 14 but also on the resource availability or more generally utilization of each corresponding one of WXs 14. In this respect, the techniques may enable a form of load balancing.

After determining those of WXs 14B-14C that are "common" to WX 14A and the corresponding addresses of routers 12B-12D in which these common WXs are integrated, router 12A may resolve the network topology to determine one of paths 25 through network system 10 that flows through the identified addresses according to the traffic engineering protocol. That is, router 12A may determine or select one of paths 25 that flows through the identified one or more of routers 12.

As an example, router 12A may receive network traffic destined for data center 22 of campus network 18 from one or more of endpoint devices 24 and identify a type of at least a portion of the network traffic. This type may refer to a protocol to which the portion of the network traffic corresponds, such as a HyperText Transfer Protocol (HTTP), a Session Initiation Protocol (SIP), a File Transfer Protocol (FTP), or any other application layer protocol, where "application layer" refers to layer seven (L7) of the Open Systems Interconnect (OSI) networking model. Often, these L7 protocols are referred to as an "application" for short and router 12A may therefore determine an application to which portions of the received network traffic corresponds. While described herein with respect to application layer protocols, the techniques may apply to protocols of other layers of the OSI model.

Router 12A may determine the application or type by applying protocol decoders in a manner similar to that described above with respect to WX 14A. Alternatively, router 12A may forward the network traffic to WX 14A to identify the various types of corresponding portions of the received network traffic. In any event, router 12A may determine that a portion of the network traffic corresponds to a given application and then determine whether WX 14A provides any network acceleration services capable of accelerating the determined type of network traffic. If not, router 12A may forward this portion of the network traffic without otherwise forwarding the portion of the network traffic to WX 14A or even so much as selecting one of paths 25, as WX 14A is not capable of applying any network acceleration services to accelerate the determined type of network traffic.

However, if determined to provide at least one network acceleration service capable of accelerating the determined type of network traffic, router 12A may access the service topology to identify one or more of WXs 14B-14D that share or provide this same or common network acceleration service as described above. Router 12A may identify, for example, that WX 14B provides this common or shared network acceleration service and return an IP address identifying router 12B. Router 12A may then access the network topology and resolve path 25B in accordance with a traffic engineering protocol based on the returned IP address associated with router 12B. Router 12A may establish this path 25B through network system 10. Next, router 12A forwards this portion of the network traffic to WX 14A and instructs WX 14A to negotiate application of the identified common network acceleration service with WX 14B, as is commonly required to apply such paired or shared network acceleration services.

This negotiation usually occurs via a Universal Datagram Protocol (UDP) or TCP session, such as the above described second TCP session. WX 14A may include information within packets that initiate the session requesting application of the common services. WXs 14A, 14B may, in this respect, negotiate application of the identified common network acceleration services while establishing the second TCP session or via an alternative UDP control session.

Assuming for purposes of illustration that this negotiation succeeds, WX 14A may apply the identified network acceleration service. In this respect, router 12A applies by way of WX 14A the at least one shared acceleration service to at least a portion of the network traffic destined for the destination of the selected path in order to accelerate delivery of the portion of the network traffic. Router 12A may then forward this accelerated portion of the network traffic to router 12B via established path 25B over the established second TCP session. Router 12B may receive this portion of the network traffic and, by virtue of the forgoing negotiation and association of the services with the second TCP session, apply the shared network acceleration service to reconstruct, from the accelerated portion, the portion of the network traffic forwarded via path 25B. In other words, router 12A forwards the accelerated portion of the network traffic along determined path 25B such that router 12B along the path applies the at least one shared acceleration service to reconstruct, from the accelerated portion, the portion of the network traffic forwarded via the path. After reconstructing or applying the shared network acceleration service to the portion (which may be better stated as applying an inverse version of the shared network acceleration service), router 12B may forward the reconstructed portion of the network traffic to its intended destination within campus network 18, e.g., data center 22, via the above described third TCP session.

As another example, router 12A may receive the network traffic destined, again, for data center 22 from one or more of endpoint devices 24 via the above described first TCP session and for another or second portion of the network traffic identify the type of this other or second portion of the network traffic in the manner described above. Router 12A may next access the security topology to determine first whether WX 14A provides a network acceleration service capable of accelerating the identified type of traffic and second, assuming WX 14A provides such a service, whether any one of WXs 14B-14D provide the same network acceleration service as that required to accelerate the identified type of service. Again, these WXs 14B-14D that provide this same service may be referred to as "common" WXs in that these pairs of WXs, e.g., WX 12A and each those common WXs, have this service in common.

For purposes of illustration, rather than assuming as in the above example that a single WX 14B provides the common service, two WXs, WX 12B and WX 12C are assumed to both have this service in common or share the same service with WX 12A. In this instance, router 12A may access the service topology and return two IP addresses, each of which identify router 12B and router 12C respectively. Based on these IP addresses, router 12A may select one of paths 25 by which to accelerate this second portion of the network traffic. Router 12A may then access the network topology and resolve path 25B in accordance with a traffic engineering protocol based on both of the returned IP addresses associated with routers 12B, 12C. Router 12A may therefore identify multiple paths, e.g., paths 25B, 25D, through network system 10 by which to apply network acceleration services. In accordance with the traffic engineering protocol, router 12A may select the one of paths 24B, 25D associated with the lowest cost in the network topology. Once selected, router 12A may proceed as described above to establish the selected one of paths 25B, 25D and WX 14A and the one of WXs 14B, 14C that reside within the selected one of routers 12B, 12C may negotiate, e.g., establish the second TCP session, and apply the common service. Router 12A forwards this accelerated second portion of the network traffic to the selected one of routers 12B, 12C, which reconstructs the second portion before forwarding this portion to the intended destination, data center 22, via the third TCP session.

In instances where the service information includes resource utilization indicating, for example, a total number of connections currently used and a total number of connections allowed by license, router 12A may, rather than provide two IP addresses, only provide a single IP address on which to perform path resolution. In other words, router 12A may select between two or more common WX devices, e.g., WXs 14B, 14C in the above example, based on the service information and, particularly, the resource utilization of the service information rather than on the network topology. Router 12A may select the one of WXs 14B, 14C that has the lowest resource utilization in these instances to perform a form of load balancing.

While described as occurring strictly based on either the service information or the network topology, the techniques described herein may be implemented such that router 12A selects between two or more competing paths, such as paths 25B, 25D based on a combination of the service information and the network topology. In these instances, router 12A may implement algorithms that balance or otherwise weigh these varying factors and perform path selection according to the resulting weighed cost. To illustrate, router 12A may assign a percentage weight of 40% to the resource utilization of the service information and another percentage weight of 60% to the total path cost defined by the network topology. Router 12A may then calculate a weighted average cost using these weights to balance the service information and the cost information of the network topology in order to provide a more nuanced or granular path selection algorithm. The techniques therefore should not be strictly limited to any particular path selection algorithm described herein buy may instead only described one aspect or embodiment of a particular path selection algorithm that incorporates the service-aware path selection techniques.

As yet another example, router 12A identify two or more common network acceleration services between WX 14A and one or more of WXs 14B-14D. In instances where WX 14A shares two or more network acceleration services with a single one of WXs 14B-14D, router 12A may implement the service-aware path selection techniques and select one of paths 25 in a manner similar to selecting one of paths 25 when WX 14A and one of WXs 14B-14B share a single common network acceleration service. WX 14A and the common one of WXs 14B-14D may however in this instance apply both network acceleration services. In instances where two or more WXs 14B-14D each share a different network acceleration service with WX 14A, router 12A may select a path through the two or more routers 12B-12D in which the common two or more of WXs 14B-14D are integrated. Path 25A provides an example of a path through routers 12D, 12B in which common WXs 14D, 14B are integrated. Router 12A may perform a form of constraint-based path selection in these instances with a constraint requiring that the selected path travel through each of the identified routers 12B-12D.

That is, router 12A may identify two different ones of routers 12B-12D that each includes an integrated WX 14B-14D that applies one of the common network acceleration services. Router 12A may then resolve the network topology to select path 25A, for example, and forward the portion of network traffic to router 12D, where WX 14D applies the first common network acceleration service, which then forwards this portion to router 12B, where WX 14B applies the second common network acceleration service. In this manner, router 12A may layer application of network acceleration services by selecting a path, such as path 25A, that flows through two or more routers 12 that include integrated WXs 14.

In some instances, router 12A may establish a path in accordance with a protocol that enables ordering of the hops along the path. For example, the MPLS signaling protocol may enable router 12A to specify a path that includes an ordered arrangement of hops, such that the path first flows through router 14D and next through router 14B. In this manner, router 12A may establish paths to arrange the order in which two or more network acceleration services are applied to the portion of traffic that travels the established path.

For portions of the network traffic for which WX 14A provides no network acceleration services, router 12A may resolve a path through network system 10 based only on the network topology in the manner described above. Assuming path 25B is associated with a lower cost than path 25D and both of paths 25B, 25D comprise the same distance to respective routers 12B, 12C, router 12A may select path 25B for this portion of the network traffic, as it provides the least expensive path through network system 10.

When resolving the network topology to select or determine each of paths 25 in accordance with the service topology, router 12A in effect layers the security topology on top of the network topology. In this respect, router 12A determines, in effect, one or more WXs 14B-14C through which the path should flow in accordance with the security topology and then resolves a path that flows through those hops in accordance with the network topology. As mentioned above, router 12A may select those WXs 14 based on dynamic link properties to facilitate, if not maximize, utilization of WXs 14 and prevent over-utilization of WXs 14, which may delay if not prevent delivery of the network traffic. Router 12A may leverage the traffic engineering (TE) protocol, such as the OSPF-TE protocol, to determine these dynamic link properties of links 17.

Alternatively, router 12A may leverage the traffic engineering (TE) protocol, such as the OSPF-TE protocol, by utilizing the dynamic link properties transmitted in accordance with the TE protocol to determine a utilization, availability and/or capacity of each of links 17. Based on this information, the TE protocol may, as implemented by router 12A, for example, inherently select paths through WXs 14 that are underutilized. Thus, if two or more of WXs, such as WXs 14B, 14C, provide the same common service, router 12A, in accordance with the TE protocol, may select a path through network system 10 that routes the network traffic to the one of routers 12B, 12C having an underutilized link. In this manner, router 12A may implement the service-aware path selection techniques to more efficiently utilize WXs 14.

Once selected or determined, router 12A may establish paths 25 through network system 10 in accordance with a network protocol, such as the MPLS signaling protocol described above. Each of paths 25 may comprise "through" or "transit" paths in that the destination of each of these paths resides outside of network system 10. As a result, each of paths 24 terminate at either of routers 12B, 12C, each of which then forwards the incoming network traffic as outgoing network traffic. Often transit paths are defined within service provider networks to facilitate the transfer of large amounts of network traffic from one end of a network to another end in order to connect one network to another network, such as branch network 20 and campus network 18. While described with respect to transit paths, the techniques should not be limited to transit paths but may apply to selecting other types of paths, such as paths that terminate within network system 10 or "terminating" paths.

In this manner, routers 12 may become more aware of services provided by remote WXs 14B-14D and intelligently form peering sessions or so-called "adjacencies" by which to apply shared or common network acceleration services. Router 12A, as described above, may therefore facilitate utilization of WXs 14 by leveraging the dynamic link properties of the TE protocol to select paths, such as paths 25, through underutilized WXs 14. Additionally, router 12A may, by maintaining the service topology in accordance with the service-aware path selection techniques described herein, layer application of network acceleration services by selecting a path through network system 10 that routes network traffic through two or more of WXs 14 integrated within routers 12.

Furthermore, router 12A, by maintaining the service topology in accordance with the service-aware path selection techniques, may enable administrators more freedom in positioning WXs 14 within network system 10. For example, an administrator may position WXs 14 at any location within network system 10 and routers 12 may dynamically inform one another of the location of WXs 14, as well as, the network acceleration services offered by these WXs 14. Routers 12 may then route traffic to those routers 12 having the integrated WXs 14 regardless of the locations of the WXs 14 within network system 10 in accordance with the service-aware path selection techniques described herein.

Figure 2:
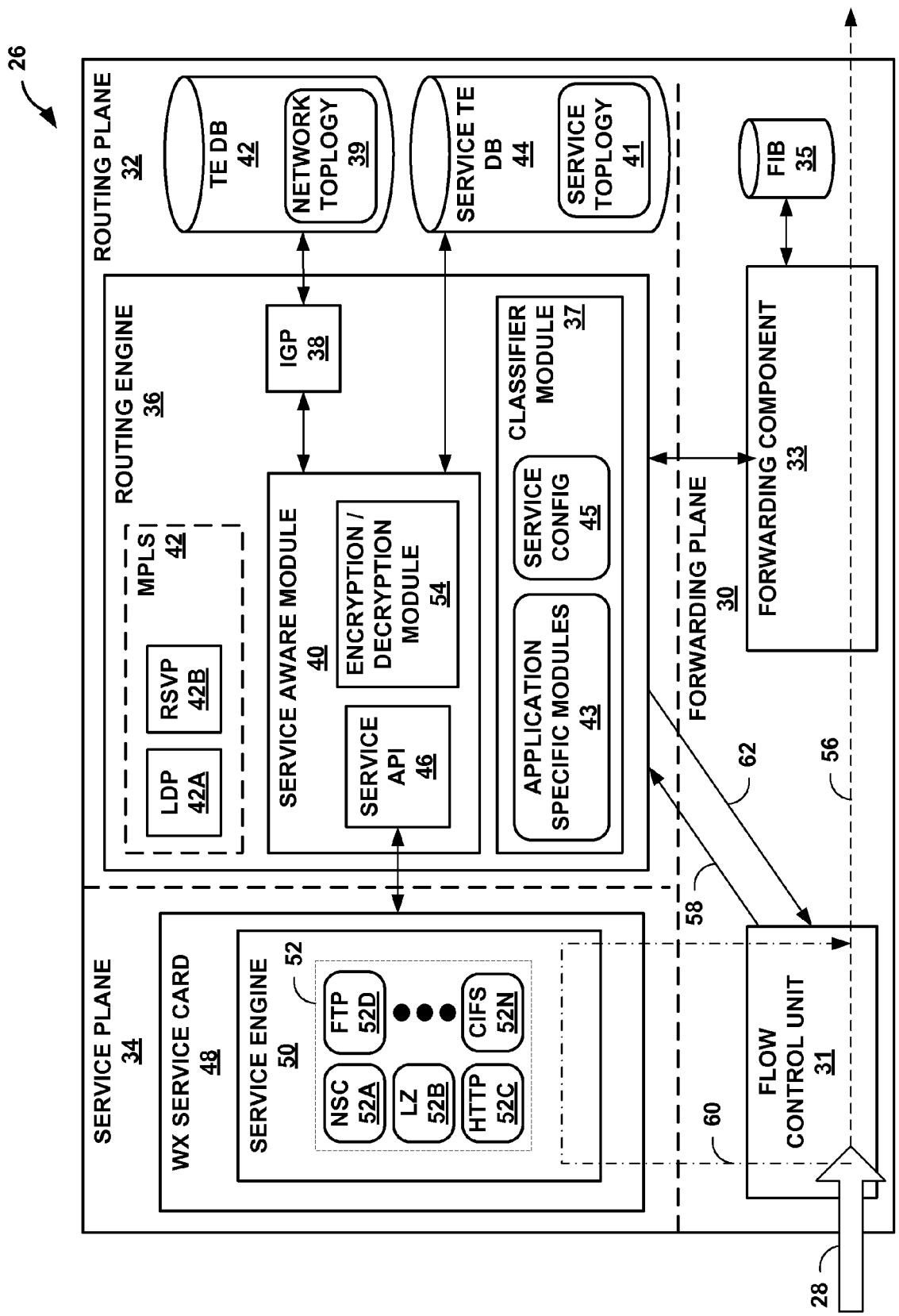
FIG. 2 is a block diagram illustrating an example embodiment of a router that performs the service-aware path selection techniques described in this disclosure.

FIG. 2 is a block diagram illustrating an example embodiment of a router 26 that performs the service-aware path selection techniques described in this disclosure. Router 26 may be substantially similar to router 12A of FIG. 1. While described as representative of router 12A, router 26 may be substantially similar to each of routers 12B-12D. In this respect, router 26 may generally represent routers 12 of FIG. 1 in that routers 12 may also include the various components, modules, planes, engines and cards described within respect to router 26.

For purposes of illustration, however, router 26 is described below as if router 26 resides in the same context as that of router 12A or, in other words, that router 26 is representative of router 12A. In this context, router 26 may receive network traffic 28 from one or more of endpoint devices, such as endpoint devices 24 shown in FIG. 1, located within a branch network 20 and forwards this traffic 28 via one or more paths 25 through one or more WANs 16 to a destination within campus network 18, such as data center 22. Router 26 may implement the service-aware path selection techniques to intelligently select one of paths 25 by which to forward portions of network traffic 28.

As shown in FIG. 2, router 26 includes a forwarding plane 30 that forwards network traffic 28, a routing plane 32 responsible for routing network traffic 28, and a service plane 34 that applies one or more services, including network acceleration services, to at least a portion of network traffic 28. Forwarding plane 44 may include a flow control unit 31 and a forwarding component 33. Flow control unit 31 may represent a software and/or hardware module that determines to which flow each packet or data unit of network traffic 28 belongs.

Forwarding component 33 may represent a software and/or hardware component, such as one or more interface cards (not shown in FIG. 2), that forwards network traffic 28. Forwarding component 33 may represent a central or distributed forwarding engine, where a distributed forwarding engine is distributed across a plurality of interface cards and a central forwarding engine resides in a central location or control unit of router 26. Forwarding component 33 may forward network traffic 28 in accordance with a Forwarding Information base 35 ("FIB 35"). FIB 35 may comprise an association or table of mappings identifying an interface by which to forward a particular packet or data unit of traffic 26. U.S. Pat. No. 7,184,437 provides details on an exemplary embodiment of a router that utilizes a radix tree for route resolution, the contents of which is incorporated herein by reference in its entirety. Moreover, forwarding plane 44 may be provided by dedicated forwarding integrated circuits normally associated with high-end routing and forwarding components of a network router. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

In some instances, forwarding plane 30 may be distributed over a plurality of interfaces or interface cards in a multi-chassis router. In other instances, forwarding plane 30 may be located in a central location, such as a processing or control unit of router 12A. Typically, routing plane 32 resides in a central location, such as the control unit of router 26. Thus, while not shown in FIG. 2, router 26 may comprise a control unit, such as a programmable processor, and other hardware, such as memory, e.g., dynamic and/or static Random Access Memory (RAM) and storage devices, such as hard drives, compact disk (CD) drives, digital video disk (DVD) drives, and the like. This memory or, more generally, computer-readable storage medium, may comprise or store instructions that cause the programmable processor to perform the secure path selection techniques described herein. In other words, the instructions may comprise one or more software or computer programs that the control unit executes to implement the secure path selection techniques described herein. In this respect, this hardware may include the following modules described with respect to routing plane 32.

Routing plane 32 includes a routing engine 36 that resolves routes through network 10 in accordance with one or more of a plurality of routing protocols. Routing engine 36 may include a classifier module 37, an Interior Gateway Protocol (IGP) module 38 ("IGP module 38"), a service aware module 40, a Multi-Protocol Label Switching (MPLS) module 42 ("MPLS 42"). Classifier module 37 represents a module comprising hardware and/or software to receive portions of network traffic 28, e.g., packets, and classify those packets based on information contained within a header, a payload, or both the header and the payload of the packet. Classifier module 37 may determine, based on this information, to which of a plurality of flows, sessions, connections and applications each of these received packets of traffic 28 corresponds.

Classifier module 37 may determine to which flow a particular one of packets of traffic 28 corresponds by extracting information referred to as a "five-tuple" from each packet. Each flow represents a flow of packets in one direction within the network traffic. A five-tuple comprises a source Internet Protocol (IP) address, a destination IP address, a source port, a destination port, and a protocol. Typically, the five-tuple is found within the header of each of the packets of traffic 28 and classifier module 37 may parse or otherwise extract the five-tuple from the header of each of these packets to identify to which flow each of the packets corresponds. Classifier module 37 may also extract and utilize additional information to identify a flow, such as a source media access control ("MAC") address and a destination MAC address.

Classifier module 37 may also, based on this information, identify an application-specific protocol or application to which each of the received packets of traffic 28 corresponds. Classifier module 37 may, for example, determine, based on a source port of the five-tuple, whether each packet of traffic 37 corresponds to an HTTP application, e.g., a web browser. In particular, classifier module 37 may include application specific modules 43 that determine to which type of application each packet of traffic 28 is associated. Application specific modules 43 may comprise, for example, a HyperText Transfer Protocol (HTTP) module that inspects each packet to determine whether each packet comprises a HTTP packet, a File Transfer Protocol (FTP) module that inspects each packet to determine whether each packet comprises a FTP packet, etc.

Classifier module 37 may also maintain a service configuration 45 ("service config 45"), where service configuration 45 represents data, rules or other information that defines associations among network acceleration services, such as the below described services 52, and a flow, a session, a connection, an application, a protocol, a port, a path or other classifiable characteristic of network traffic 28. In this respect, service configuration 45 may comprise one or more rules that define associations between network acceleration services and one or more identifiable characteristic of network traffic 28, such as a port number. Usually, an administrator or other network user defines this service configuration data so as to statically define associations between the network acceleration services and particular aspects of network traffic 28.

IGP 38 may represent any software and/or hardware module that implements an interior gateway protocol, such as the OSPF protocol, an Intermediate System to Intermediate System (IS-IS) routing protocol, an Interior Gateway Routing Protocol (IGRP), an Routing Information Protocol (RIP), or any other interior protocol. While described herein with respect to IGPs, the techniques should not be limited in this respect, but may include Exterior Gateway Protocols (EGPs), such as a Border Gateway Protocol (BGP). IGP 38 may generally represent a module that stores and maintains data referred to above as a network topology. FIG. 2 illustrates this data as "network topology 39" and IGP 38 may maintain this data within a traffic engineering (TE) database (DB) 44 ("TE DB 44"). TE DB 42 may be referred to as a "traffic engineering" DB 42 in that the network topology stored to this database may be used by IGP 38 to perform traffic engineering.

Service aware module 40 may represent a software and/or hardware module that stores and maintains data referred to above as a service topology that defines the services, resources and location of devices within the network that are capable of providing network acceleration services. FIG. 2 illustrates this data as "service topology 41" and service aware module 40 maintains this data within a service TE DB 44, where DB 44 may be referred to as a "traffic engineering" DB in that routing engine 36 may also utilize this service topology when performing traffic engineering. Service aware module 40 may include a service Application Programming Interface ("service API 46") by which service aware module 40 may request or otherwise determine network acceleration services provided by service plane 34. While described herein as an API, service API 46 may represent one exemplary embodiment by which to determine services provided by service plane 34 and the techniques may be implemented so as to determine these services in other ways, such as by way of a proprietary protocol, periodic updates, etc.

MPLS module 42 may comprise one or more hardware and/or software modules that each implements a different one of the various protocols included under the general label of "MPLS," such as the above described signaling protocol referred to as LDP, which routing engine 36 may utilize in establishing a path determined in accordance with the service-aware path selection techniques described herein. FIG. 2 illustrates two exemplary MPLS protocol modules, "LDP 42A" and "RSVP 42B," each of which implement the Label Distribution Protocol (LDP) and the resource reservation protocol (RSVP), respectively.

The techniques however should not be limited to these two exemplary protocols and may be implemented with any MPLS or tunneling protocol, including proprietary path selection or point-to-point protocols. MPLS 42 may therefore generally represent any module that implements a protocol capable of establishing a path through a network and, while described with respect to these MPLS signaling protocols, the techniques should not be limited to these exemplary protocols. To illustrate, the techniques may be implemented with respect to a proprietary point-to-point protocol that establishes a point-to-point connection between adjacent WXs. In this sense, the proprietary point-to-point protocol may establish a path between WXs over which the second TCP session may be established such that the common services may be negotiated and applied. Regardless, the techniques may be implemented with respect to any protocol capable of establishing a path between WX devices.

Service plane 34 may include one or more service cards, such as a WX service card 48, installed within router 26. WX service card 48 may represent a card inserted into a chassis of router 26 (not shown in FIG. 2). Router 26 may therefore be referred to as a "multi-chassis" router 26. Router 26 may include a backplane or other high-speed switch by which to couple to service plane 34 generally and to each of the one or more service cards, in particular. WX service card 48 may provide the functionality described above with respect to WXs 14 and may therefore represent a WX device integrated within router 26. In other words, WX service card 48 may represent WX 14A assuming as described above that router 26 represents router 12A.

This integrated WX device, or WX service card 48, may include a service engine 50 that applies one or more of network acceleration services 52 to network traffic 28. Network acceleration services 42 include a number of different network acceleration services, such as Non-uniform Spectral Compression (NSC) service 42A ("NSC 42A"), a Lempel-Ziv (LZ) compression service 42B ("LZ 42B"), a HyperText Transfer Protocol (HTTP) acceleration service 42C ("HTTP 42C"), a File Transfer Protocol (FTP) acceleration service 42D ("FTP 42D"), and a Common Internet File System (CIFS) acceleration service ("CIFS 42N"). Although not shown in FIG. 2 for ease of illustration purposes, service engine 50 may comprise a cache, which it utilizes to provide additional network acceleration services.

Initially, upon powering up, activating, starting or otherwise enabling router 26, both IGP 38 and service aware module 40 may generate link or network topology 39 and service topology 41, which each respectively storing these topologies 39 and 41 to TE DB 42 and service TE DB 44. That is, TE DB 42 may represent, in general, a storage device that stores a current or up-to-date topology 39 of a network system, such as network system 10. Service TE DB 44 may represent a storage device that stores a current or up-to-date service topology 41 in accordance with the secure path selection techniques described herein. In other words, service aware module 40 may dynamically update security TE DB 44 with a full picture of all network acceleration devices within the network system, which may be referred to as a "service topology."

In order to generate this service topology 41, service aware module 40 may, in order to determine services 52 provided by WX service card 48, first invoke service API 46 in order to issue a request to WX service card 48. This request may request WX service card 48 to supply data listing services 52. This same request may also request the above described utilization information or service aware module 40 may invoke service API 46 to issue another request that requests this utilization information. In this manner, service aware module 40 may determine services 52 provided by WX service card 48 as well as possibly the current utilization of WX service card 48. Often, the request for services comprises a different or separate request for utilization, as the services do not change or are not updated as frequently as that of the utilization. Thus, rather than repeatedly receive the same services 52 for each request and a different utilization, service aware module 40 may issue separate requests, one for the services and a different or separate request for the utilization. This may be particularly beneficial in that service aware module 40 may repeatedly poll or otherwise determine the utilization at a high frequency in order to perform the form of load balancing described herein. By issuing discreet requests for utilization, service aware module 40 may limit the impact on WX service card 48 in servicing these requests.

WX service card 48 may service these requests and determine, based on the request, data describing either services 52 or utilization, e.g., a total number of connections available by license and a number of currently utilized connections, or both services 52 and utilization. Regardless of the composition of the data or information, this data may generally be characterized as "service information." WX service card 48 may forward this service information back to service aware module 40 via a return service API 46 function call. Although not shown in FIG. 2 for ease of illustration purposes, service card 48 may also implement a service API similar to service API 46 in order to communicate with service aware module 40.

Upon receiving this service information via service API 46, service aware module 40 may store this service information to service TE DB 44 as service topology 41. Particularly, service aware module 40 may create a new entry within a service table or other data structure defined by service topology 41, where this service entry is keyed or associated with the IP address assigned to router 26 and stores the service information. After determining and storing this security information, service aware module 40 may employ encryption/decryption unit 54 to encrypt the service information. Encryption/decryption unit 54 may represent a module that implements encryption and decryption algorithms for encrypting and decrypting data. In this instance, encryption/decryption unit 54 may encrypt the determined service information. Once encrypted, service aware module 40 may forward this encrypted service information to IGP 38. IGP 38, upon receiving this information, may generate an opaque LSA that includes an opaque filed defining this encrypted service information and forward this opaque LSA to forwarding component 33, which in turn, may forward this opaque LSA as outgoing network traffic 56 to adjacent network devices within network system 10.

Meanwhile, IGP 38, to generate network topology 39, may receive LSAs from other network devices via forwarding component 33. These LSAs may arrive as incoming network traffic 28. IGP 38 may process these LSA similar to IGP 38, which parses these LSAs to determine network or link data. IGP 38 may then store this link data to TE DB 42 as network topology 39, thereby maintaining network topology 39 within TE DB 42. IGP 38 may also receive opaque LSAs from other adjacent network devices, e.g., routers 12B-12D, that include an opaque field defining service information. IGP 38 may upon determining that the LSA comprises this type of opaque LSA, parse the service information from the LSA and forward the security information to service aware module 40. Service aware module 40 may employ encryption/decryption unit 54 to decrypt the service information, if encrypted. Service aware module 40 may next update and therefore maintain service TE DB 44 with this received service information to accurately reflect the service topology of the network system, such as network system 10. As described above, this service information may not only include information indicating network acceleration services provided by a corresponding network acceleration device (whether integrated or stand-alone) but also availability or other utilization information concerning the availability of these services, or more generally, the availability of the corresponding network acceleration device. In this manner, IGP 38 may create, e.g., store data defining, and maintain network topology 39, while service aware module 40 in cooperation with IGP 38 may create, e.g., store data defining, and maintain service topology 41.

After determining both of network topology 39 and service topology 41 in this manner, router 26 may begin receiving network traffic 28. More specifically, flow control unit 31 of forwarding plane 30 may receive network traffic 28 and, for each discrete data unit or packet, of network traffic 28, flow control unit 31 may identify a flow to which each of these packets correspond based on a five tuple defined in a header of each of the packets. Flow control unit 31 may maintain a table or other data structure (not shown in FIG. 2), which may be referred to herein as a "flow table," to store those flows that are currently active within network system 10. Flow control unit 31 may parse the five tuple from each of the packets and utilize this five tuple as a key into the flow table. If an entry exists in the flow table for the parsed five tuple, flow control unit 31 may access this entry to determine an action to take with respect to packets of this identified flow. This action may comprise forwarding the packet to its destination without applying any service, providing a particular class or Quality of Service (QoS), or applying one or more services, including one or more of services 52, to the packet prior to forwarding the packet to its intended destination.

Assuming that router 26 has just begun to receive the packets of network traffic 28, the flow table likely does not store many, if any, flows. Flow control unit 31 may therefore not determine a flow entry within the flow table that corresponds to the extracted five-tuple. In these instances, flow control unit 31 may classify the packet as a new flow and update the flow table with a new flow entry that is associated with the extracted five-tuple. Flow control unit 31 may take a default action with respect to packets associated with new flows, whereby flow control unit 31 forwards these new packets, which are shown in FIG. 2 as new packets 58, to routine engine 36 for classification.

Upon receiving new packets 58 from flow control unit 31, routing engine 36 passes these new packets 58 to classifier module 37, which proceeds to identify a network application to which these new packets 58 correspond. Classifier module 37 may iteratively invoke application specific modules 43 until one of application specific modules 43 positively identifies an application to which each of new packets 58 corresponds. Classifier module 37 may alternatively invoke two or more of application specific modules 43 in parallel to speed identification of the corresponding application for each of new packets 58. Regardless, classifier module 37 may classify these new packets 58 by identifying one of these exemplary manners an application to which each of these new packets 58 correspond. This classification may also be referred to as determining a type of each of new packets 58.

Once classified, classifier module 37 may next determine whether to apply one or more network acceleration services 52 to the flows to which new packets 58 correspond based service configuration 45. That is, classifier module 37 may utilize the rules or policies defined by service configuration 45 in order to determine whether, for example, to apply services 52 to flows associated with particular application types determined by application specific module 43. In this respect, routing engine 36 and more particularly classifier module 37 may determine whether WX service card 48 provides services capable of accelerating network traffic of the particular identified type. Alternatively, classifier module 37 may not make this determination and instead pass the type to service aware module 40, which may then access service topology 41 to determine whether WX service card 48 provides this service. In any event, it is assumed for purposes of illustration, however, that service configuration 45 indicates that router 26 apply at least one of services 52 to at least one of the flows to which one of new packets 58 corresponds.

After determining to apply one of services 52 to a flow to which one of new packets 58 corresponds, classifier module 37 may pass the type, e.g., determined application to which the one of new packets 58 corresponds, and intended destination to routing engine 36. Routing engine 36 may then utilize this type and destination to intelligently select one of paths 25 by which to ensure application of the at least one of services 52 identified by service configuration 45 in accordance with the service-aware path selection techniques described herein.

Specifically, routing engine 36 may forward the type to service aware module 40, which may access service access service topology 41 within service TE DB 44 to determine whether any one of WXs 14B-14D provide the at least one of services 52 indicated by service configuration 45 for this type of application. Service aware module 40 may access the service table defining service topology 41 and retrieve any entries that provide this same or common one of services 52. Each retrieved entry may define a corresponding IP address by which to reach the WX device that provides this common service, and service aware module 40 may extract these IP addresses. In some instances, service aware module 40 determines that a single one of WXs 14B-14D provide the common service, retrieves the corresponding entry and extracts the IP address associated with the one of routers 12B-12D in which the determined one of WXs 14B-14D is integrated.

In other instances, service aware module 40 may determine two or more of WXs 14B-14D each provide the same or common service. To resolve this conflict, service aware module 40 may then access the utilization information included within the service information defined by service topology 41 and select the one of the two or more WXs 14B-14D associated with a lower dynamic utilization property. In other words, service aware module 40 may select the one of the common WXs having a lower utilization of available connections, as calculated on a percentage basis. In any event, service aware module 40 may identify one of WXs 12B-12D that provides a service in common with WX service card 48. Service aware module 40 forwards the address associated with this selected one of WXs 14B-14D to IGP 38, which may utilize this address in resolving the paths through the network system.

IGP 38 may receive both the addresses associated with the selected common one of WXs 12B-12D from service aware module 40 as well as the intended destination of the packet from classifier module 37. IGP 38 may perform a form a "loose" or constraint-based routing using these addresses in that the path selection performed by IGP 38 uses the addresses a loose constraint when selecting hops through which the path must flow. The addresses may specify mandatory hops, however the IGP 38 may choose any other hops to construct the path from the given source to the given destination. IGP 38 may select the path based on the dynamic link properties stored within network topology 39 to account for bandwidth utilization.

While described as separate components, IGP 38 may incorporate or otherwise include various portions of service aware module 40 as an extension of one of the IGP protocols, such as OSPF. In this respect, OSPF or another one of the protocols represented by IGP 38 may be extended to base route resolution on service topology 41. In these instances, IGP 38 may perform constraint-based route resolution in a manner that accounts for service topology 41 to select a path through the network to ensure network acceleration services are applied to the received traffic.

After determining one of the paths, IGP 38 may establish the path through the network in accordance with a link state protocol, such as one of Multi-Protocol Label Switching (MPLS) signaling protocols, e.g., LDP or RSVP. IGP 38 may therefore forward the path, or one or more addresses identifying each hop along the path, to one of MPLS signaling protocol modules 42, e.g., LDP 42A or RSVP 42B, whereupon this one of MPLS module 42 establishes an LSP through the network system that corresponds to the determined path in accordance with, for example, LDP.

As an example, MPLS module 42 or some other path establishing protocol may, when establishing a given path, indicate for applicable hops of the path, e.g., those hops that provide network acceleration services, the services to be applied along with an identifier identifying the network acceleration device, e.g., one of WXs 14B-14D, that provides the services. MPLS module 42 may include this information in a path setup request that it transmits throughout the network in order to setup or negotiate the path.

After establishing the path, service aware module 40 may once again invoke a service API 46 to issue a negotiation request to WX service card 48. This negotiation request may include the address associated with the common WX and request that WX service card 48 negotiate with the common one of WXs 12B-12D identified by the address to establish a connection by which to apply the one or more shared or common services. WX service card 48 may perform this negotiation and return the result of the negotiation to service aware module 40. If the negotiation is unsuccessful, service aware module 40 may, in instances of only a single common WX, return this result to routing engine 36, which issues an update (shown in FIG. 2 as one of updates 62) to flow control unit 31 indicating that the flow associated with this packet are not to be forwarded to service card 48 or otherwise undergo application of services 52. In instances of two or more common WXs, service aware module 40 may proceed to request that IGP 38 form another path over which connection negotiations with a next, more utilized, one of the common WXs can occur. In other words, service aware module 40 may proceed to request that WX service card 48 negotiate with the common WXs in order of increasing utilization until either none of WXs will agree to apply the share services or one of the common WXs will agree to apply the shared services. The first negotiation however likely results in agreement, especially considering that the least utilized common WX is contacted first.

Routing engine 36 may then, after establishing the path and negotiating application of the one or more services, update flow control unit 31 such that flow control unit 31 forwards a portion of network traffic 28 to WX service card 48, as shown in FIG. 2 as service traffic 60. This update is shown in FIG. 2 as one of updates 62. In particular, routing engine 36 may receive the setup request information via the one of MPLS modules 42 and configure a bitmap variable in forwarding plane 30, one for each path, route or LSP currently traversing edge router 26. The bitmap variable may indicate that the forwarding engine forward traffic received via a particular path to the internal WX service card 48. The bitmap variable may also indicate which of services 52 corresponding WX service card 48 applies to the received traffic. Forwarding plane 30 may then forward the portion of traffic 28, e.g., service traffic 60, to WX service card 48, for example, along with a communication indicating those of services 52 to apply to service traffic 60 based on the bitmap variable.

In this manner, routing engine 36 may identify a hop along the established path for a given flow as corresponding to WX service card 48. Routing engine 36 may, in some instances, update an entry that includes the bitmap variable corresponding to the flow for which the path was established such that flow control unit 31 forwards a portion of traffic 28 to WX service card 48 prior to forwarding this traffic 28 as outgoing traffic 56. Each flow entry may identify the flow by its corresponding five-tuple, and identify via the bitmap variable whether to apply one or more of services 52 provided by WX service card 48.

Flow control unit 31 may then, upon receiving network traffic 28, access the flow table and determine whether a packet or data unit of network traffic 28 includes a five-tuple associated with one of the flow entries of the flow table. If associated with an entry that indicates none of services 52 are to be applied, flow control unit 31 may forward the packet as outgoing network traffic 56. However, if flow control unit 31 determines that one or more of services 52 are to be applied to the packet, flow control unit 31 forwards the packet or data unit to WX service card 48. Service module 50 of WX service card 48 may then apply the identified one or more of services 52. WX service card 48, after applying the one or more of services 52, forwards the packet back to flow control unit 31.

Forwarding component 33 may also receive information from routing engine 36 indicating the established path by which to forward service traffic 60 processed by WX service card 48. Forwarding component 33 may store this path information to FIB 35 and upon receiving service traffic 60 of outgoing traffic 56, forward service traffic 60 in accordance with the path information stored to FIB 35. In particular, forwarding component 33 may access FIB 35 to determine which of available paths 25 to forward service traffic 60. Upon determining the path, forwarding component 33 may update service traffic 60 with any headers, labels (such as MPLS labels), tags or other information typically required to route service traffic 60 along the path. FIB 35 may indicate the output interface by which to forward this updated service traffic, whereupon forwarding component 33 may forward updated service traffic 60 via this interface to the network system.

In some instances, the established path may, as described above, traverse two or more of WXs 12B-12D, either external or internal to routers, whereupon these additional network acceleration devices may each apply one or more network acceleration services to service traffic 60. Service aware module 40 may identify each of these WXs 12B-12D by an associated address (e.g., an address identifying corresponding ones of routers 12B-12D) and define an order in which the path is to traverse each of these WXs 12B-12D as well as request that WX service card 48 negotiate with both of these common WX via service API 46. IGP 38 may also perform the loose constraint based path selection to select a path through the network system that traverses these identified common WXs in the order specified by service aware module 40. In most other respect, routing engine 36 may operate in a manner similar to that described above with respect to a single common WX to establish the path, negotiate application of the services, update flow control unit 31, forward traffic to WX service card 48 and otherwise forward traffic along the established path. In this manner, one or more network acceleration services may be layered upon one another so as to apply multiple services to traffic traversing a particular path.

While processing packets is described above with respect to an internal network acceleration device, e.g., WX service card 48, the techniques may also apply to external network acceleration devices in a similar manner. Moreover, while various module included within routing engine 36 are described as receiving service information, LSAs, opaque LSAs and other communications for ease of discussion, routing engine 36 may generally receive these communications via forwarding plane 30, e.g., interface cards, forwarding component 33 and/or flow control unit 31.

Figure 3A:
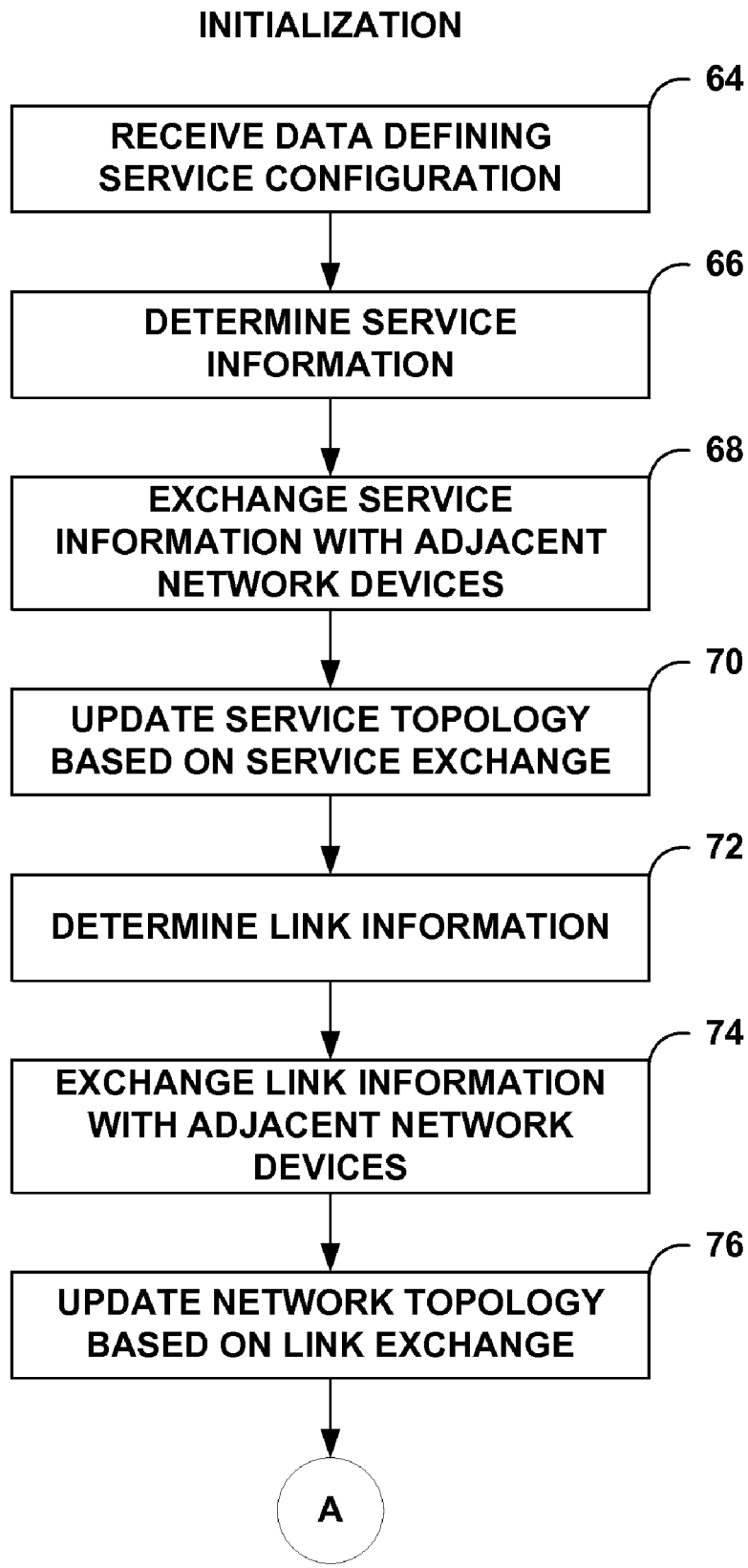
FIGS. 3A and 3B are flow charts illustrating example operation of a network device in performing the service-aware path selection techniques described in this disclosure.
Figure 3B:
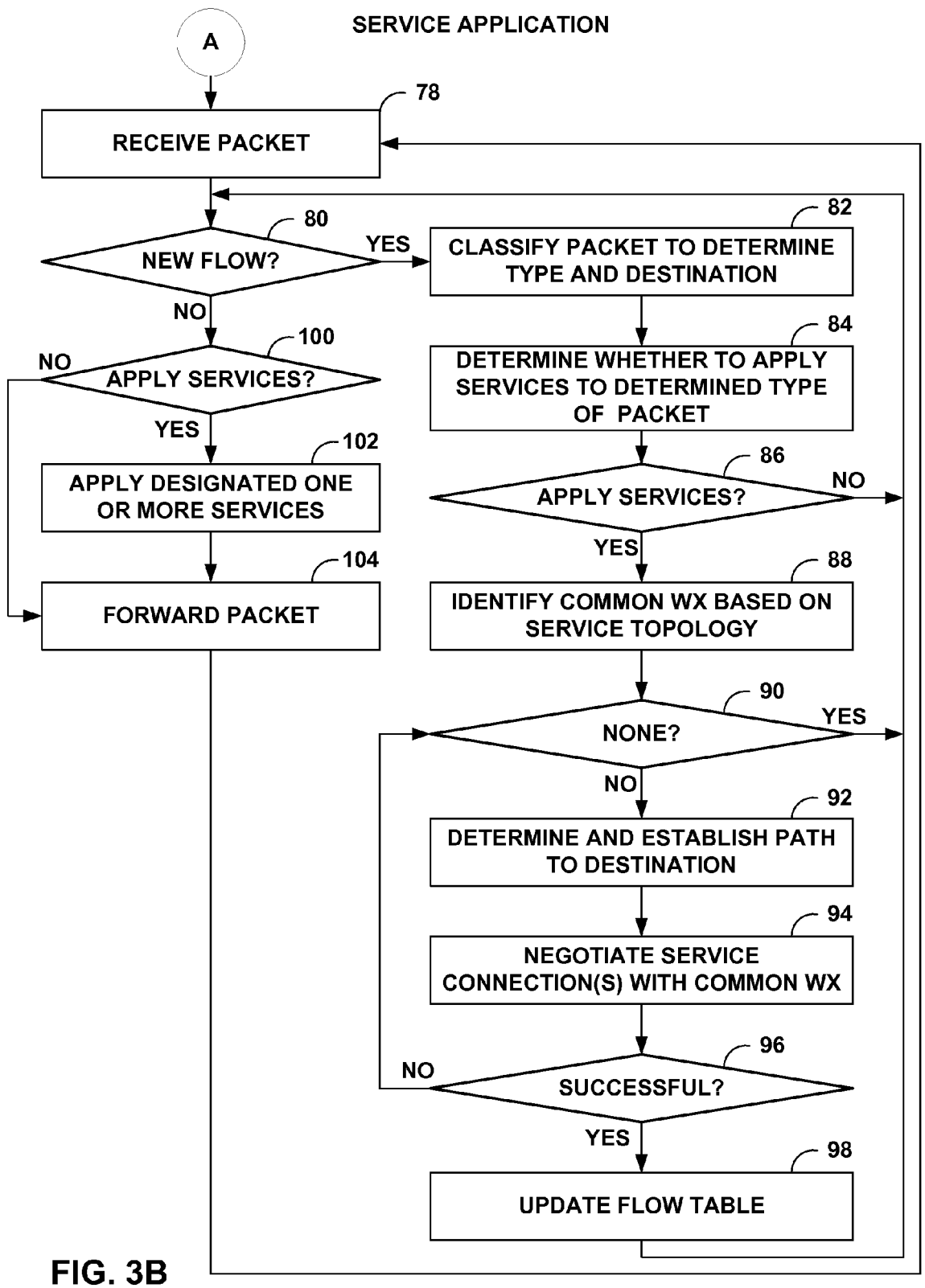

FIGS. 3A,3B are flow charts illustrating example operation of a network device, such as router 26 of FIG. 2, in performing the service-aware path selection techniques described in this disclosure. Although described with respect to edge router 26 of FIG. 2, the techniques may be implemented by any network device capable of selecting paths through the network, such as routers 12B-12D of FIG. 1. With respect to routers 12B and 12C, in particular, these routers 12B, 12C may perform the techniques in order to select paths by which to accelerate traffic from campus network 18 to branch network 20. Thus, the techniques should not be limited to the exemplary embodiment described herein.

Referring first to FIG. 3A, an administrator or other network user may initially specify or otherwise provide service configuration 45 to router 26. In particular, this administrator may interact with a user interface presented by a UI module (not shown in FIG. 2) executing within routing engine 36 to input data defining service configuration 45. Typically, the administrator specifies service configuration 45 in order to initialize or before enabling router 26, however classifier module 37 may come pre-configured with a standard or base service configuration. In other embodiments, service information is learned and aggregated dynamically by querying components of the service card. Regardless of how service configuration 45 is loaded, router 26 may receive data defining service configuration 45 that defines associations between services 52 and particular flows, sessions, connections, application, or any other identifiable or classifiable characteristic of a particular packet (64).

During this initialization phase, router 26 and, more particularly, service aware module 40 may determine service information describing services 52 provided by WX service card 48 (66). In particular, service aware module 40 may, as described above, invoke service API 46 and issue a request via service API 46 requesting that WX service card 48 provide data describing services 52. WX service card 48 may respond to this request by issuing a response via service API 46 that includes data defining services 52. Service aware module 40, also as a part of determining the service information, may issue another request via service API 46 to determine the utilization of WX service card 48. Again, as described above, WX service card 48 may issue a response via service API 46 identifying the utilization. Service aware module 40 may in this manner determine service information, which may include both the data defining services 52 and the utilization information, and store this data to service TE DB 44 as service topology 41. While shown as determining this service information only once in FIG. 3A, service aware module 40 may periodically poll, via service API 46, WX service card 48 for service information. Often, this repeated polling involves a request only for the utilization so as to properly maintain an accurate representation of service topology 41.

After determining this security information, service aware module 40 may forward this service information to IGP 38, which may generate an opaque LSA in accordance with a link state protocol, such as the above described OSPF, and store this service information to an opaque field. Service aware module 40 may, in some instances, encrypt this service information prior to forwarding the service information to IGP 38 using encryption/decryption module 54. Regardless, IGP 38 may forward this opaque LSA via forwarding component 33 to adjacent network devices, such as routers 12B-12D. IGP 38 may also receive opaque LSAs from these adjacent network devices that also specify security information concerning, for example, WXs 14B-14D. IGP 38 may extract the security information from these opaque LSAs and forward the security information to service aware module 40, which, if encrypted, may decrypt the service information using encryption/decryption module 54 prior to updating service topology 41 of service TE DB 44 with the received service information. In this manner, routing engine 36 may exchange service information with adjacent network devices and update service topology 41 based on this so-called "service exchange" (68, 70).

Meanwhile, IGP 38 may determine link information describing the state of links to which router 26 couples (72). IGP 38 may store this link information to TE DB 42 as network topology 39. IGP 38 may generate one or more LSAs, store this link information to appropriate fields of the LSAs and transmit these LSAs to adjacent network devices. IGP 38 may also receive LSAs from the adjacent network devices, e.g., routers 12B-12D, extract the link information and update network topology 39 in accordance with the received link information. In this manner, routing engine 36 and more particular IGP 38 exchange link information with adjacent network devices and update network topology 39 based on this so-called "link exchange" (74, 76). While shown as occurring during an initialization phase or during a phase prior to receipt of network traffic, routing engine 36 may, in parallel with or while receiving network traffic, continually generate and receive both opaque LSAs storing service information and LSAs storing link information, extract this information and update respective service topology 41 and link topology 39 within service TE DB 44 and TE DB 42. In this respect, routing engine 36 may maintain network topology 39 and service topology 41 to accurately reflect the current link and service conditions within the network system.

Referring to FIG. 3B, which illustrates a service application phase that may occur after the initialization phase shown in FIG. 3A, router 26, and more particularly, flow control unit 31 of forwarding plane 30 included within router 26, may receive a packet of network traffic 28 (78). Flow control unit 31 may determine whether this packet corresponds to a new flow in the manner described above (80). If the packet corresponds to a new flow ("YES" 80), flow control unit 31 may forward the packet to routing plane 32 as one of new packets 58. Routing engine 36 of routing plane 32 may forward this packet to classifier module 37, which may in the manner described above classify the packet in order to determine both the type, e.g., an application to which the packet corresponds, and the intended destination, e.g., an IP destination address (82). Classifier module 37 may, for example, invoke application specific modules 43 to determine the application to which the packet corresponds or type of the packet. Based on this type, classifier module 37 may access service configuration 45 to determine, as one example, whether to apply one or more of services 52 to this determined type of packet (84).

Assuming service configuration 37 associates one or more of services 52 with the determined type, classifier module 37 may determine that one or more of services 52 apply to the determined type of packet ("YES" 86). While described herein as determining a type of packet by determining an application to which the packet corresponds, this type may refer to any classifiable characteristic of the packet, including a particular source and/or destination port number, a particular source and/or destination IP address, a particular protocol, a particular payload length or packet length, a particular pattern included within either or both the header or payload of the packet or any other classifiable aspect of a packet. The techniques therefore should not be strictly limited to a particular application.

After determining that WX service card 52 is to apply one or more of services 52 to the determined type of packet, classifier module 37 may forward the determined one or more services 52 to service aware module 40. Upon receiving these one or more services 52, service aware module 40 may, as described above, access service topology 41 within service TE DB 44 to identify those of WXs 14B-14D that provide at least one of the same or common services as those received one or more services 52. These identified one or more of WXs 14B-14D may be referred to herein as "common" WXs, and service aware module 40 may, in this manner, identify one or more common WXs based on service topology 41 (88).

Assuming that service aware module 40 identifies at least one common WX ("NO" 90), service aware module 40 may then forward the address of the common WX to IGP 38. IGP 38 may, having previously received the determine destination from classifier module 37, access network topology 39, determine, based on network topology 39, one of paths 25 to the destination through the network system using a form of "loose" constraint-based routing in the manner described above and invoke one of MPLS modules 42 to establish the determined one of paths 25 through the network system (92). IGP 38 may return the path back to service aware module 40.

In response to this path, service aware module 40 may invoke service API 46 to transmit a request specifying an address associated with the selected common ones of WXs 12B-12D, e.g., an address associated with corresponding ones of routers 12B-12D, to WX service card 48 requesting that WX service card 48 establish an acceleration adjacency with that common WX and negotiate the application of the common one or more of services 52 (94). WX service card 48 may transmit a response to this negotiation request via service API 46 to service aware module 40 indicating a result of the negotiation.

Assuming again for purposes of illustration that the negotiation was successful ("YES" 96), service-aware path selection module 40 may forward the address associated with the common one or more of WXs 12B-12D to routing engine 36. Routing engine 36 may then generate and issue an update, e.g., one of updates 62, to flow control unit 31 that causes flow control unit 31 to update the flow table in the manner described above (98).

Routing engine 36 may then forward the packet back to flow control unit 31, which may once again determine whether the packet corresponds to a new flow (80). As flow control unit 31 updated the flow table in response to the one of updates 62, flow control unit 31 may determine that the flow to which the packet corresponds is not a new flow ("NO" 80). Flow control unit 31 may determine based on the updated entry for this determined flow that the one or more identified ones of services 52 discussed above are to be applied to the packet and forward the packet as one packet of service traffic 60 to WX service card 48 of service plane 34 in the manner described above ("YES" 100). Service engine 50 of WX service card 48 may then apply the one or more of services 52 to this packet before forwarding the packet back to forwarding plane 30, where forwarding component 33 may forward the packet via the determined path through the network system, as described above (102, 104).

In some instances, flow control unit 31 may receive both the one of updates 62 and the packet from routing engine 36 and may, based on the one of updates 62, determine both that the flow to which the packet corresponds is not new and that the one or more services 52 indicated in the one of updates 62 are to be applied to the packet without accessing the flow table. In other words, the techniques should not be limited to the exemplary embodiment or implementation described herein and may be implemented in a manner that optimizes performance or otherwise improves the speed with which flow control unit 31 makes these determinations.

The above assumptions presumed that service configuration 45 indicated that one or more services 52 were to be applied to the determined type of packet ("YES" 86), that at least one of WXs 14B-14D provided a service in common or the same as the determined one or more of services 52 ("NO" 90), and that negotiation with these one or more common WXs was successful ("YES" 96). However, a failed common WX determination causes routing engine 36 to return the packet to forwarding plane 30 without updating the flow table to indicate application of one or more of services 52 to the flow to which this packet corresponds. If more than one common WX is identified however and negotiation with a first common WX does not succeed ("NO" 96"), service aware module 40 may select a second or next common one of WXs 14B-14D and cause IGP 38 to determine and establish a path to the intended destination (92). Service aware module 40 may then cause WX service card 48 to negotiate the application of common services over the established path (94).

This process may determine until no common WX are available for adjacent service application ("NO" 90) or until a successful negotiation occurs for application of the common services with one of the common WXs ("YES" 96).

As a result, flow control unit 31 having not received one of updates 62 for the flow to which the packet corresponds, may not update the flow table to indicate that one or more of services 52 are to be applied to the flow to which the packet corresponds. Thus, flow control unit 31 may receive the packet from routing engine 36, determine that the packet does not correspond to a new flow ("NO" 80), as flow control unit 31 may add an entry to the flow table for the flow prior to forwarding the packet to routing engine 36, but determine based on the flow entry to which the packet corresponds that no services are to be applied to this packet ("NO" 100). Flow control unit 31 may, in response to this determination, forward the packet to packet forwarding engine 33, which may in turn forward the packet based on the destination identified within a header of the packet (104). In other words, router 26 may forward the packet, in these instances, without applying one of services 52 to the packet. Again, while described as being separate from IGP 38, service aware module 40 may reside or be included within IGP 38 such that IGP 38 is extended to include service aware module 40. In these embodiments, IGP 38 may perform the constraint-based routing in the manner described above. In other words, IGP 38 may receive from classifier module 37 an application type of the packet as well as the services to be applied to the packet. IGP 38 may then access service topology 41 of service TC DB 44 to identify common WX and then select a path based upon both service topology 41 and network topology 39. That is, IGP 38 may identify the common WXs and select a path based on network topology 39 to the selected common WX. In this respect, IGP 38 may be extended to utilize service topology 41 in order to select a path through network topology 39.

Thus, while described as separate components, the techniques may be implemented such that IGP 38 is extended to perform some if not all of the functionality described with respect to service aware module 40. In this respect, a router 26 may invoke a protocol, e.g., IGP 38, on to select a path through the network that includes the second router having the common WX, such that the path includes a plurality of next hops from the first router to the destination. Router 26 therefore selects the path through the network so that the second router is positioned along the path between the first router and the destination.

Figure 4:
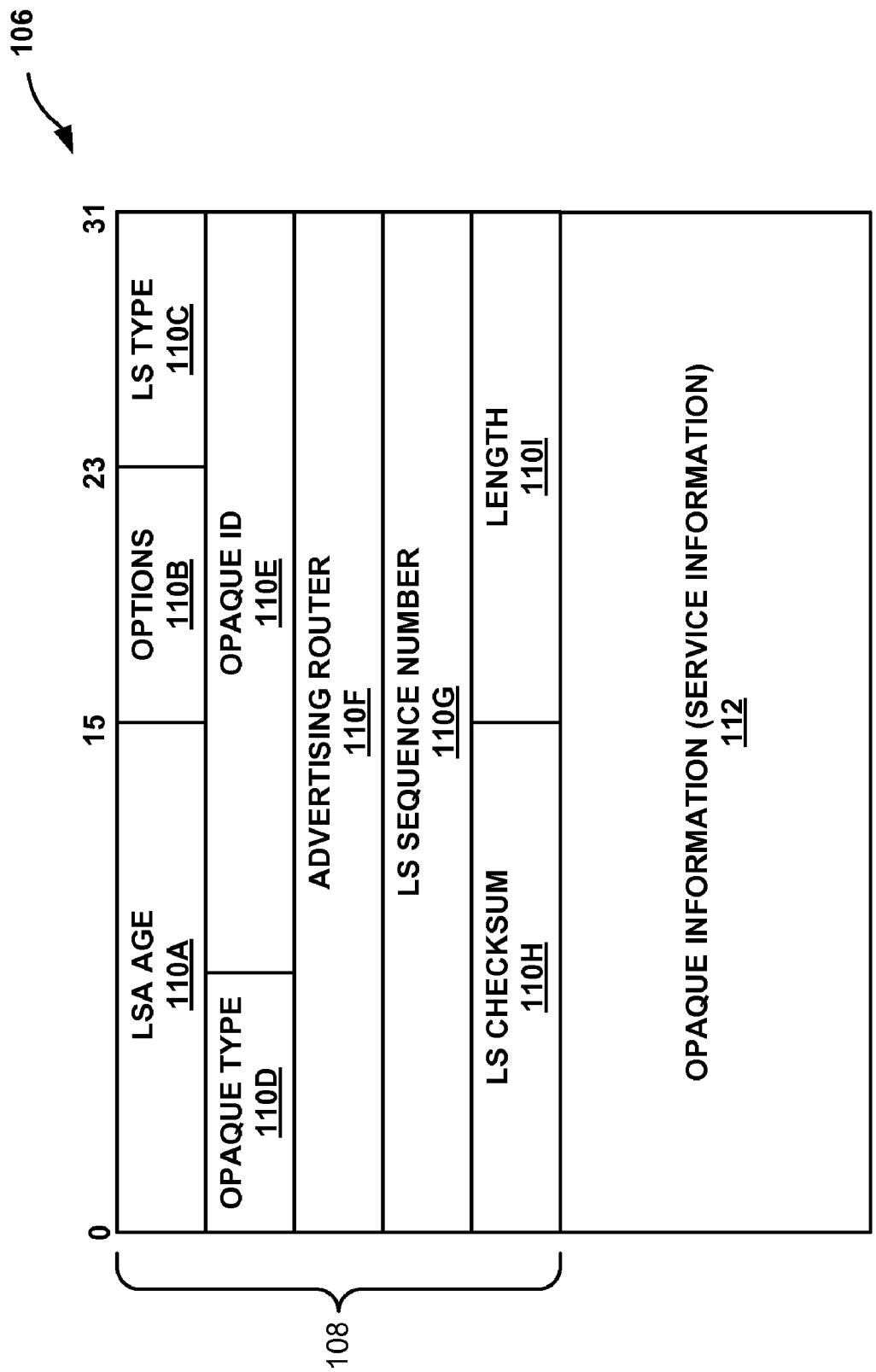
FIG. 4 is a block diagram illustrating an exemplary Link State Advertisement (LSA) that includes security information in accordance with secure path selection techniques.

FIG. 4 is a block diagram illustrating an exemplary Link State Advertisement (LSA) 106 that includes security information in accordance with secure path selection techniques. LSA 106 may comprise an opaque LSA, as described above. Moreover, LSA 106, as shown in the exemplary embodiment of FIG. 4, may comply with the OSPF protocol in that it adheres to the four byte width limitation specified by the OSPF protocol. That is, LSA 106 comprises a set of four-byte wide rows, as reflected in FIG. 4 by the 0-31 bit range for each row shown at the top of LSA 106. Further details of the format of opaque OSPF LSAs can be found in RCE 5250, Internet Engineering Task Force (IETF), July, 2008, which is herein incorporated by reference in its entirety.

As shown in FIG. 4, LSA 106 includes an LSA header 108. LSA header 108 comprises an LSA age field 110A ("LSA age 110A"), an options field 110B ("option 110B"), an LS type field 110C ("LS type 110C"), a link state identifier field divided into an opaque type field 110D ("opaque type 110D") and an opaque ID field 110E ("opaque ID 110E"), an advertising router field 110F ("advertising router 110F"), a link state sequence number field 110G ("LS sequence number 110G"), a link state checksum field 110H ("LS checksum 110H") and a length field 110I ("length 110I"). Although shown as comprising fields 110A-110I ("fields 110"), LSA header 108 may comprise more or less fields than that shown in FIG. 4.

LS age field 110A typically specifies the age of the LSA 106 in seconds and is used to distinguish between two LSAs specifying the same LSA sequence number in their respective LS sequence number field 110F. Options field 110B may specify which optional capabilities are associated with the LSA 106. LS type field 110C indicates the format and function of the LSA 106, i.e., the type of LSA. Particular to opaque LSAs, LS type field 110C may identify the topological range of distribution of LSA 106. For example, if LS type field 110C stores a "9," LSA 106 associated with LSA header 108 is distributed on a link-local scope, indicating that LSA 106 is not to be flooded beyond a local (sub) network. Alternatively, if LS type field 110C stores a "10," LSA 106 is distributed on an area-local scope, indicating that LSA is not to be flooded beyond their area of origin. Generally, LS type field 110C can be any value within the range of 9-11 for opaque LSAs, where a value of "11" indicates that LSA 106 can be flooded throughout an entire autonomous system. In this respect, the LS type field may limit the distribution of opaque LSA 106 and control the extent to which security topology 41 may extend or cover.

LS type filed 98C may, therefore, indicate whether LSA 106 is an intra or inter area opaque LSA. The link state ID field typically identifies a portion of the routing domain that is being described by LSA 106. For opaque LSAs, such as LSA 106, the link-state ID of the opaque LSA is divided into opaque type field 110D and opaque ID 110E. An opaque type set to "1" indicates a traffic engineering LSA. LSA 106 may generally comprise an opaque type field 110D set to "1" to indicate that opaque information 112 relates to traffic engineering. Alternatively, opaque type field 110D may be set by IGP 38, for example, to any other value agreed upon to indicate that opaque information 112 stores security information. Opaque ID field 110E defines a unique ID identifying the portion of the routing domain that is being described by LSA 106.

Advertising router field 110E may specify the OSPF router identifiers of the LSA 106's originator. LS sequence number field 110F may comprise a signed 32-bit integer that OSPF modules, such as IGP module 38, uses to detect old and duplicate LSAs. LS checksum field 110G may indicate whether the LSA accompanying LSA header 108 contains errors, and IGP module 38 may employ LS checksum field 110G to discard possibly faulty LSAs 106. Length field 110H indicates the length of LSA 106.

IGP 38 may generate LSA 106, such that LSA header 108 identifies this LSA 106 as an opaque LSA. In this respect, IGP 38 may generate LSA 106 in accordance with RFC 5250. Specifically, IGP 38 may set LS type field 110C to one of values 9-11 depending on the topological scope desired. IGP 38 may further specify the correct opaque type in opaque type field 110D. Typically, as mentioned above, IGP 38 specifies an opaque type of "1" in opaque type field 110D to indicate that LSA 106 is an opaque LSA defining traffic engineering metrics or information. IGP 38 may generate the remaining field 110E-98I in accordance with the OSPF or OSPF-TE protocol. IGP 38 may set length field 110I to the appropriate length depending on the amount of opaque information 112.

IGP 38 may then insert security information received from service aware module 40 as opaque information 112 of LSA 106. RFC 5250 generally provided no restrictions upon the type of information a traffic engineering LSA, such as LSA 106, may store in opaque information 112. Thus, IGP 38 may again leverage the OSPF protocol to define service information within opaque information 112. As LSA 106 may include service information, LSA 106 may be referred to herein as a "service" LSA. A "service" LSA may represent one example of advertisement or data unit that includes service information and the techniques should not be limited to LSAs. In some instances, service aware module 40 may encrypt the service information such that only other service aware modules similar to service aware module 40 may decrypt this service information stored as opaque information 112 in LSA 106.

IGP 38 may prepend or otherwise edit the service information to indicate that opaque information 112 defines service information. As a result, other IGP or OSPF modules may, upon encountering opaque information 112 determine that this opaque information includes service information for processing by a service aware module, similar to service aware module 40. IGP 38 may then transmit LSA 106 so as to inform other network devices that operate in accordance with the service-aware path selection techniques of the service provided by integrated WX service card 48.

Figure 5:
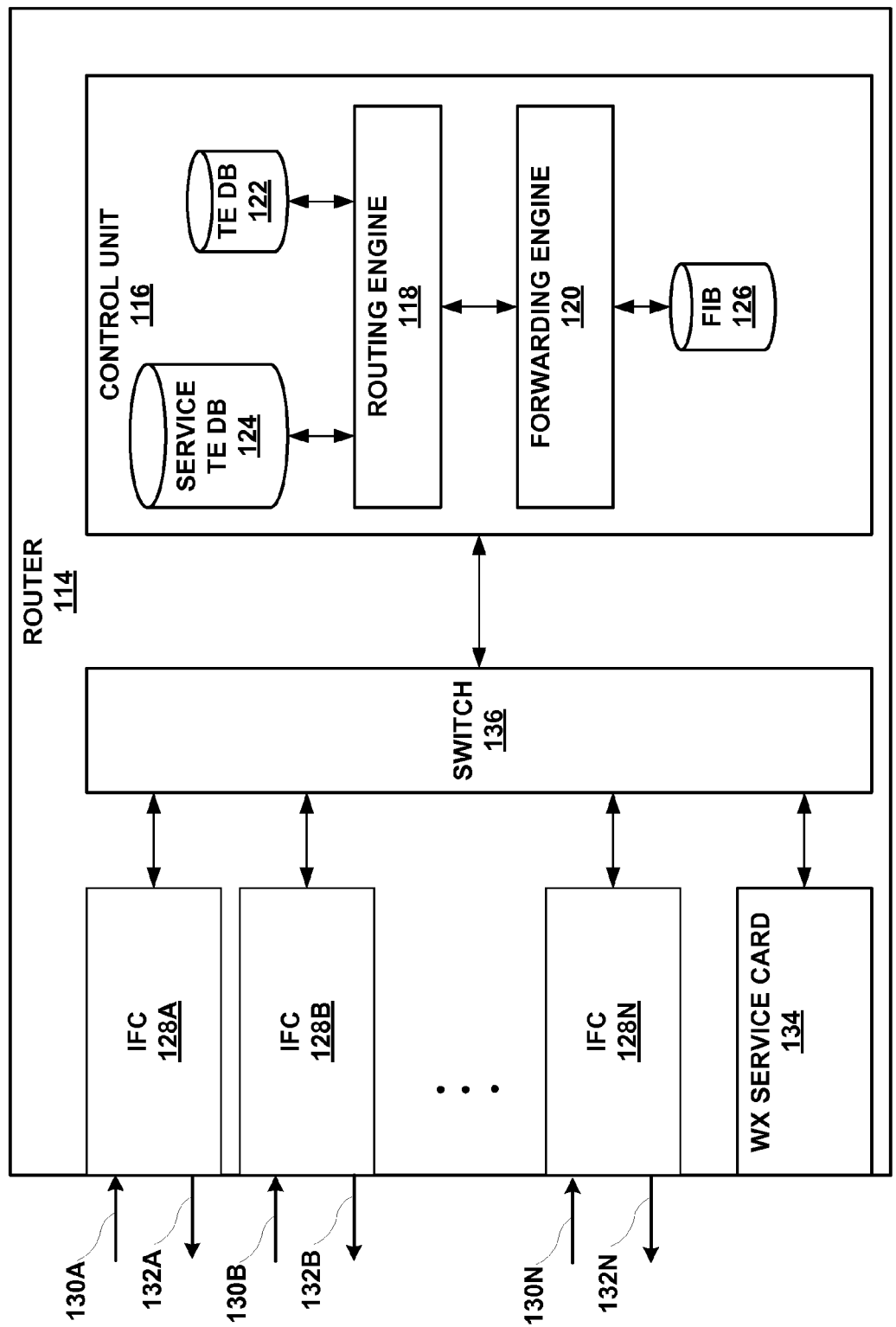
FIG. 5 is a block diagram illustrating another exemplary embodiment of a router that implements the service path selection techniques.

FIG. 5 is a block diagram illustrating another exemplary embodiment of a router 114 that implements the service path selection techniques. Although described with respect to router 114, any network device, such as a stand-alone WX device, a hub, a switch, et cetera may implement the techniques described herein and the principles of the invention should not be limited to this exemplary embodiment.

As shown in FIG. 5, router 114 includes a control unit 116 that comprises a routing engine 118 and a forwarding engine 120. Control unit 116 may comprise any combination of hardware and software that implement the techniques described in this disclosure. As mentioned above, control unit 116 may comprise one or more processors, Application Specific Integrated Circuits (ASICs), integrated circuits or any other processing or control unit or element or combination thereof, and a memory or storage device. In some instances, the memory or storage device (e.g., generally, a computer-readable storage medium) may comprise the above described instruction that cause the programmable processor to perform the techniques described herein. These instructions may form a computer or software program or other executable module that the programmable processor is capable of executing.

Routing engine 118 may be substantially similar to routing engine 36 of FIG. 2 in that routing engine 118, although not shown in FIG. 5, may include modules and database similar to those described above with respect to routing engine 36 that perform the service-aware path selection techniques. Routing engine 118 may generally store, update and maintain routing information or link information stored within TE DB 122 to accurately reflect the topology of the network and other entities. TE DB 122 may be substantially similar to TE DB 42. Routine engine 118 may also in accordance with the techniques described herein store, update and maintain service information within service TE DB 124, which may be substantially similar to service TE DB 44.

Routing engine 118 may, as described above, determine or select a path based on service information received from other network security devices and maintained within service TE DB 124. In accordance with routing information stored in TE DB 122, forwarding engine 120 may maintain forwarding information within FIB 126 that associates network destinations with specific next hops and corresponding interfaces ports. FIB 126 may be substantially similar to FIB 35. Routing engine 118 may install the determined path in forwarding engine 120, such that forwarding engine 120 may maintain FIB 126 in this manner.

Router 114 further includes a set of interface cards (IFCs) 128A-128N ("IFCs 128") for communicating packets via inbound links 130A-130N ("inbound links 130") and outbound links 132A-132N ("outbound links 132") and a WX service card 134. Each of IFCs 128 couple to and communicate with control unit 116 via switch 136. Switch 136 may comprise any communication medium capable of communicatively coupling one or more endpoints, e.g., IFCs 128, control unit 116, and WX service card 134. Forwarding engine 120 may receive packets forwarded via switch 136 from IFCs 128 and forward those packets via switch 136 and IFCs 128 on outbound links 132A-132N according to forwarding information stored to FIB 126. In this manner, forwarding engine 120 provides the forwarding functionality of router 114. WX service card 134 may be substantially similar to WX service card 48 of FIG. 2.

As described above, router 114 may receive the packets or more generally, network traffic, via incoming links 130, whereupon IFCs 128 forward those packets via switch 136 to forwarding engine 120. Forwarding engine 120 may maintain information requiring that packets associated with particular flows, as one example, should be first sent to WX service card 134 prior to forwarding those packets via one of outbound links 132.

Forwarding engine 120 may then forward these packets to WX service card 132 for processing or servicing in the manner described above. After servicing, WX service card 132 may forward the packets back to forwarding engine 120 via switch 136, whereupon forwarding engine 120 forwards the packets via one of outbound links 132 associated with the determined path.

WX service card 132 may therefore comprise any card or other removable processing unit that may be inserted into a slot. WX service card 132 may, once inserted into the slot, interface with switch 136, whereby WX service card 132 may receive, service (e.g., apply one or more security services) and forward packets. In this manner, any network device may implement the service-aware path selection techniques described herein to decrease administrator oversight through automatic discovery of and routing to network acceleration devices and possibly promote more efficient utilization of network acceleration devices.

Various embodiments of the invention have been described. These and other embodiments are within the scope of the following claims.

The invention claimed is:

1. A method comprising:
   determining, with a first router, first service information that describes a first set of acceleration services provided by a first service engine included within the first router;
   receiving, with the first router, a routing protocol message having second service information that describes a second set of acceleration services provided by a second service engine included within a second router;
   receiving, with the first router, a packet, wherein the packet identifies a destination to which the packet is destined;
   classifying, with the first router, the packet to determine a software application to which the packet corresponds;
   identifying, with the first router, at least one of the first set of accelerations services to apply to the packet based on the determined software application to which the packet corresponds;
   determining, with the first router, whether the second set of acceleration services described by the second service information shares the identified at least one of the first set of acceleration services;

based on the determination, invoking a protocol on the first router to select a path through a network that includes the second router, wherein the path includes a plurality of next hops from the first router to the destination, and wherein the first router selects the path through the network so that the second router is positioned along the path between the first router and the destination;

based on the determination, applying, with the first service engine of the first router, the at least one shared acceleration service to the packet in order to accelerate delivery of the packet; and forwarding, with the first router, the packet along the determined path such that the second service engine of the second router along the path applies the at least one shared acceleration service to reconstruct the packet forwarded via the path.

2. The method of claim 1, wherein receiving a routing protocol message having the second service information comprises receiving, in accordance with a link state routing protocol, a link state advertisement (LSA) from the second router that includes the second service information.

3. The method of claim 2, wherein the LSA comprises an opaque LSA that includes the second service information as opaque information.

4. The method of claim 1,
wherein the first router comprises a forwarding plane, a routing plane and a service plane,
wherein the service plane includes a Wide Area Network (WAN) acceleration (X) service card that includes the first service engine,
wherein the routing plane includes a routing engine that implements a service Application Programming Interface (API) by which to communicate with the WAN X (WX) service card, and
wherein determining the first set of service information comprises:
issuing, with the routing engine, a request in accordance with the service API that requests the first set of service information from the WX service card; and
receiving, with the routing engine, a response to the request in accordance with the service API that includes the first set of service information.

5. The method of claim 1, further comprising:
storing the first and second service information to a database included within the first router in order to define a service topology; and
storing data that defines a service configuration, wherein the service configuration associates the software application to the at least one of the first set of acceleration services,
wherein classifying the packet to determine a software application to which the packet corresponds comprises iteratively applying a plurality of application specific modules to the packet until one of the application specific modules classifies the packet as corresponding to the software application, wherein each of the application specific modules attempts to classify the packet as corresponding to a different software application, and wherein the software application comprises a layer seven (L7) protocol, and
wherein identifying the at least one of the first set of accelerations services comprises accessing the service configuration using the determined software application as a key to retrieve the at least one of the first set of acceleration services associated by the service configuration with the software application.

6. The method of claim 5,
wherein the second service information includes an address associated with the second router, and
wherein determining whether the second set of acceleration services described by the second set of service information shares the identified at least one of the first set of acceleration services comprises:
accessing the service topology stored in the database;
determining based on the service topology that the second set of acceleration services shares the identified at least one of the first set of acceleration services; and
retrieving the address associated with the second router upon determining that the second set of acceleration services shares the identified at least one of the first set of acceleration services.

7. The method of claim 6,
wherein the first router comprises a forwarding plane, a routing plane and a service plane,
wherein the service plane includes a Wide Area Network (WAN) acceleration (X) service card that includes the first service engine,
wherein the routing plane includes a routing engine that implements a service Application Programming Interface (API) by which to communicate with the WX service card, and
the method further comprising:
based on the determination that the second set of acceleration services shares the identified at least one of the first set of acceleration services, issuing, with the routing engine, a request in accordance with the service API to the WAN X (WX) service card requesting that the WX service card negotiate a service connection by which to apply the at least one shared service with the second router identified by the address;
negotiating, with the WX service card, the service connection in response to the request; and
receiving, with the routing engine, a response to the request in accordance with the service API from the WX service card identifying a result of the negotiation with the second router identified by the address.

8. The method of claim 1,
wherein selecting the path comprises selecting the path in accordance with an Interior Gateway Protocol (IGP), the method further comprising establishing the path through the network in accordance with a MultiProtocol Label Switching (MPLS) signaling protocol.

9. The method of claim 1,
wherein the first router comprises a forwarding plane, a routing plane and a service plane,
wherein the forwarding plane includes a flow control unit that stores a flow table having a plurality of flow entries that each correspond to a different packet flow within the network,
wherein the service plane includes a Wide Area Network (WAN) acceleration (X) service card that includes the first service engine,
wherein the routing plane includes a routing engine, the method further comprising:
forwarding, with the routing engine, an update to the flow control unit of the forwarding plane in response to determining that the second set of acceleration services shares the identified at least one of the first set of acceleration services; and
updating, with the flow control unit, one of the plurality of entries included within the flow table associated with a flow to which the packet corresponds to indicate that the WX service card is to apply the identified at least one of the services to the corresponding flow;

forwarding, with the flow control unit, the packet and metadata that identifies the at least one shared acceleration service to the WX service card in accordance with the updated flow entry included within the flow table, wherein applying the at least one shared acceleration service comprises:

receiving the packet and metadata from the forwarding plane; and applying the at least one shared acceleration service identified by the metadata to the packet, and wherein forwarding the accelerated packet comprises forwarding the accelerated packet with a forwarding component of the forwarding plane.

10. The method of claim 1, further comprising:

receiving, with the first router, third service information that defines a third set of acceleration services provided by a third service engine included within a third router, wherein the first, second and third routers are each different from one another, wherein the second and third service information each includes a utilization indicating an availability of a corresponding one of the second and third service engines;

determining whether the third set of acceleration services described by the third service information shares the identified at least one of the first set of acceleration services, wherein both the second and third service engines provide the same at least one shared acceleration services; and selecting either the second or the third router based on the utilizations included within the respect second and third service information, wherein selecting the path comprises selecting the path such includes the selected one of the second or third routers.

11. The method of claim 1, further comprising:

receiving, with the first router, a routing protocol message having link information from the second router; and storing, with the first router, the link information to a database included within the first router to define a network topology, wherein selecting the path further comprises selecting the path in accordance with the network topology.

12. The method of claim 11, wherein receiving the link information comprises receiving a Link State Advertisement (LSA) in accordance with a link state protocol that includes the link information.

13. The method of claim 1, wherein the first router comprises a forwarding plane, a routing plane and a service plane, wherein the service plane includes a Wide Area Network (WAN) acceleration (X) service card that includes the first service engine, wherein the routing plane includes a routing engine that implements a service Application Programming Interface (API) by which to communicate with the WX service card, and wherein determining the first service information includes:

issuing, with the routing engine, a request in accordance with the service API to the WAN X (WX) service card requesting a utilization indicating an availability of the WX service card; and receiving, with the routing engine, a response to the request in accordance with the service API from the WX service card that includes the utilization as a total number of connections allowed by a license and a number of the total number of connection allowed currently being used by the WX service card to accelerate the network traffic.

14. A first router included within a network comprising:

a first service engine that provides a first set of acceleration services;

a control unit that determines first service information that describes the first set of acceleration services provided by the first service engine; and at least one interface card that receives a routing protocol message having second service information that describes a second set of acceleration services provided by a second service engine included within a second router and receives a packet that identifies a destination to which the packet is destined, wherein the control unit further classifies the packet to determine a software application to which the packet corresponds, identifies at least one of the first set of accelerations services to apply to the packet based on the determined software application to which the packet corresponds, determines whether the second set of acceleration services described by the second service information shares the identified at least one of the first set of acceleration services, and invokes, based on the determination, a protocol on the first router to select a path through the network that includes the second router, wherein the path includes a plurality of next hops from the first router to the destination, and wherein the first router selects the path through the network so that the second router is positioned along the path between the first router and the destination, wherein the first service engine applies the at least one shared acceleration service to the packet in order to accelerate delivery of the packet, and wherein the at least one interface card forwards the packet along the determined path such that the second service engine of the second router along the path applies the at least one shared acceleration service to reconstruct the packet forwarded via the path.

15. The first router of claim 14, wherein the at least one interface card receives, in accordance with a link state routing protocol, a link state advertisement (LSA) from the second router that includes the second service information.

16. The first router of claim 15, wherein the LSA comprises an opaque LSA that includes the second service information as opaque information.

17. The first router of claim 14, further comprising a service plane, wherein the control unit includes a forwarding plane and a routing plane, wherein the service plane includes a Wide Area Network (WAN) acceleration (X) service card that includes the first service engine, wherein the routing plane includes a routing engine that implements a service Application Programming Interface (API) by which to communicate with the WX service card, issues a request in accordance with the service API that requests the first set of service information from the WX service card, and receives a response to the request in accordance with the service API that includes the first set of service information.

18. The first router of claim 14, further comprising a database, wherein the control unit further stores the first and second service information to the database in order to define a service topology, and stores data that defines a service configuration, wherein the service configuration associates the software application to the at least one of the first set of acceleration services, and wherein the control unit further includes a classifier module that iteratively applies a plurality of application specific modules to the packet until one of the application specific modules classifies the packet as corresponding to the software application, wherein each of the application specific modules attempts to classify the packet as corresponding to a different software application, and wherein the software application comprises a layer seven (L7) protocol, and accesses the service configuration using the determined software application as a key to retrieve the at least one of the first set of acceleration services associated by the service configuration with the software application.

19. The first router of claim 18, wherein the second service information includes an address associated with the second router, and wherein the control unit further accesses the service topology stored in the database, determines based on the service topology that the second set of acceleration services shares the identified at least one of the first set of acceleration services, and retrieves the address associated with the second router upon determining that the second set of acceleration services shares the identified at least one of the first set of acceleration services.

20. The first router of claim 19, further comprising a service plane, wherein the control unit further comprises a forwarding plane and a routing plane, wherein the service plane includes a Wide Area Network (WAN) acceleration (X) service card that includes the first service engine, wherein the routing plane includes a routing engine that implements a service Application Programming Interface (API) by which to communicate with the WX service card, and wherein the routing engine, based on the determination that the second set of acceleration services shares the identified at least one of the first set of acceleration services, issues a request in accordance with the service API to the WAN X (WX) service card requesting that the WX service card negotiate a service connection by which to apply the at least one shared service with the second router identified by the address, wherein the WX service card negotiates the service connection in response to the request, and wherein the routing engine receives a response to the request in accordance with the service API from the WX service card identifying a result of the negotiation with the second router identified by the address.

21. The first router of claim 14, wherein the control unit invokes an Interior Gateway Protocol (IGP) to select the path and establishes the path through the network in accordance with a MultiProtocol Label Switching (MPLS) signaling protocol.

22. The first router of claim 14, further comprising a service plane, wherein the control unit further comprises a forwarding plane and a routing plane, wherein the forwarding plane includes a flow control unit that stores a flow table having a plurality of flow entries that each correspond to a different packet flow within the network, wherein the service plane includes a Wide Area Network (WAN) acceleration (X) service card that includes the first service engine, wherein the routing plane includes a routing engine that forwards an update to the flow control unit of the forwarding plane in response to determining that the second set of acceleration services shares the identified at least one of the first set of acceleration services, wherein the flow control unit updates one of the plurality of entries included within the flow table associated with a flow to which the packet corresponds to indicate that the WX service card is to apply the identified at least one of the services to the corresponding flow and forwards the packet and metadata that identifies the at least one shared acceleration service to the WX service card in accordance with the updated flow entry included within the flow table, wherein the first service engine receives the packet and metadata from the forwarding plane and applies the at least one shared acceleration service identified by the metadata to the packet, and wherein the forwarding plane includes a forwarding component that forwards the accelerated packet.

23. The first router of claim 14, wherein the at least one interface card receives third service information that defines a third set of acceleration services provided by a third service engine included within a third router, wherein the second and third service information each includes a utilization indicating an availability of a corresponding one of the second and third service engines, wherein the control unit determines whether the third set of acceleration services described by the third service information shares the identified at least one of the first set of acceleration services, wherein both the second and third service engines provide the same at least one shared acceleration services, selects either the second or the third router based on the utilizations included within the respect second and third service information, and selects the path such includes the selected one of the second or third routers.

24. The first router of claim 14, further comprising a database, wherein the at least one interface card receives a routing protocol message having link information from the second router, and wherein the control unit stores the link information to the database to define a network topology and selects the path in accordance with the network topology.

25. The first router of claim 24, wherein the at least one interface card receives a Link State Advertisement (LSA) in accordance with a link state protocol that includes the link information.

26. The first route of claim 14, further comprising a service plane, wherein the control unit comprises a forwarding plane and a routing plane, wherein the service plane includes a Wide Area Network (WAN) acceleration (X) service card that includes the first service engine, wherein the routing plane includes a routing engine that implements a service Application Programming Interface (API) by which to communicate with the WX service card, issues a request in accordance with the service API to the WAN X (WX) service card requesting a utilization indicating an availability of the WX service card, and receives a response to the request in accordance with the service API from the WX service card that includes the utilization as a total number of connections allowed by a license and a number of the total number of connection allowed currently being used by the WX service card to accelerate the network traffic.

27. A network system comprising:

a first network that includes a first router, wherein the first router includes:

a first service engine that provides a first set of acceleration services; and a control unit that determines first service information that describes the first set of acceleration services provided by the first service engine; and a second network that includes a second router, wherein the second router includes a second service engine that provides a second set of acceleration services, wherein the first router further includes at least one interface card that receives a routing protocol message having second service information that describes the second set of acceleration services provided by the second service engine included within the second router and receives a packet that identifies a destination to which the packet is destined, wherein the control unit further classifies the packet to determine a software application to which the packet corresponds, identifies at least one of the first set of accelerations services to apply to the packet based on the determined software application to which the packet corresponds, determines whether the second set of acceleration services described by the second service information shares the identified at least one of the first set of acceleration services, and invokes, based on the determination, a protocol on the first router to select a path through a third network that includes the second router, wherein the path includes a plurality of next hops from the first router to the destination, and wherein the first router selects the path through the third network so that the second router is positioned along the path between the first router and the destination, wherein the first service engine applies the at least one shared acceleration service to the packet in order to accelerate delivery of the packet, and wherein the at least one interface card forwards the packet along the determined path such that the second service engine of the second router along the path applies the at least one shared acceleration service to reconstruct the packet forwarded via the path.

28. The network system of claim 27, wherein the first network and the second network are connected to one another via a Wide Area Network (WAN), the network system further includes the WAN that comprises a third router, wherein the third router includes a third service engine that provides a third set of network acceleration services, wherein the at least one interface card receives third service information that defines the third set of acceleration services provided by the third service engine included within the third router, wherein the second and third service information each includes a utilization indicating an availability of a corresponding one of the second and third service engines, wherein the control unit determines whether the third set of acceleration services described by the third service information shares the identified at least one of the first set of acceleration services, wherein both the second and third service engines provide the same at least one shared acceleration services, selects either the second or the third router based on the utilizations included within the respect second and third service information, and selects the path such includes the selected one of the second or third routers.

29. A non-transitory computer-readable medium comprising instructions for causing a programmable processor to:

determine, with a first router, first service information that describes a first set of acceleration services provided by a first service engine included within the first router;

receive, with the first router, a routing protocol message having second service information that describes a second set of acceleration services provided by a second service engine included within a second router;

receive, with the first router, a packet, wherein the packet identifies a destination to which the packet is destined;

classify, with the first router, the packet to determine a software application to which the packet corresponds;

identify, with the first router, at least one of the first set of accelerations services to apply to the packet based on the determined software application to which the packet corresponds;

determine, with the first router, whether the second set of acceleration services described by the second service information shares the identified at least one of the first set of acceleration services;

based on the determination, invoke a protocol on the first router to select a path through a network that includes the second router, wherein the path includes a plurality of next hops from the first router to the destination, and wherein the first router selects the path through a third network so that the second router is positioned along the path between the first router and the destination;

based on the determination, apply, with the first service engine of the first router, the at least one shared acceleration service to the packet in order to accelerate delivery of the packet; and forward, with the first router, the accelerated packet along the determined path such that the second service engine of the second router along the path applies the at least one shared acceleration service to reconstruct the packet forwarded via the path.

\* \* \* \* \*